(12) United States Patent
Arakawa et al.

(10) Patent No.: US 11,790,571 B2
(45) Date of Patent: *Oct. 17, 2023

(54) INFORMATION PROCESSING DEVICE AND COMPUTER READABLE MEDIUM

(71) Applicant: FUJIFILM Business Innovation Corp., Tokyo (JP)

(72) Inventors: Kei Arakawa, Yokohama (JP); Ami Kanzaki, Yokohama (JP); Kodai Suzuki, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 1 day.

This patent is subject to a terminal disclaimer.

(21) Appl. No.: 17/551,888

(22) Filed: Dec. 15, 2021

(65) Prior Publication Data

US 2022/0108496 A1 Apr. 7, 2022

Related U.S. Application Data

(63) Continuation of application No. 16/854,209, filed on Apr. 21, 2020, now Pat. No. 11,232,603.

(30) Foreign Application Priority Data

Oct. 28, 2019 (JP) .................. 2019-195411

(51) Int. Cl.
*G06T 11/00* (2006.01)
*G06T 7/246* (2017.01)
*G06T 7/73* (2017.01)

(52) U.S. Cl.
CPC .............. *G06T 11/00* (2013.01); *G06T 7/246* (2017.01); *G06T 7/73* (2017.01)

(58) Field of Classification Search
None
See application file for complete search history.

(56) References Cited

U.S. PATENT DOCUMENTS

| | | | |
|---|---|---|---|
| 6,215,498 | B1 | 4/2001 | Filo et al. |
| 2003/0229441 | A1 | 12/2003 | Pechatnikov et al. |
| 2011/0216961 | A1 | 9/2011 | Ishige et al. |
| 2013/0322702 | A1 | 12/2013 | Piemonte et al. |
| 2013/0325343 | A1 | 12/2013 | Blumenberg et al. |
| 2016/0033770 | A1 | 2/2016 | Fujimaki et al. |
| 2019/0271846 | A1 | 9/2019 | Fujimaki et al. |
| 2020/0033940 | A1 | 1/2020 | Ohashi |

FOREIGN PATENT DOCUMENTS

| | | |
|---|---|---|
| JP | 2011-186536 A | 9/2011 |
| JP | 2015-026286 A | 2/2015 |
| JP | 2016-122392 A | 7/2016 |

*Primary Examiner* — Robert J Craddock
(74) *Attorney, Agent, or Firm* — Oliff PLC

(57) ABSTRACT

An information processing device includes: a processor configured to generate an body object in a virtual space corresponding to a body in a real space, associate an associated object with at least a part of the body object, the associated object being displayed in the virtual space in association with the body, and move, when movement of the body object in the virtual space is detected, the associated object while maintaining a relative positional relationship between the associated object and the body object.

14 Claims, 39 Drawing Sheets

FIG. 22

| PRINT CONTENT | PROCESSING WORK | PROCESSING DEVICE NUMBER |
|---|---|---|
| PAMPHLET | SADDLE STITCHING | 3 |
| BOOK | PERFECT BINDING | 2 |

TABLE

INFORMATION PROCESSING DEVICE AND COMPUTER READABLE MEDIUM

CROSS-REFERENCE TO RELATED APPLICATIONS

This is a continuation application of U.S. patent application Ser. No. 16/854,209, filed Apr. 21, 2020, which is based on and claims priority under 35 USC 119 from Japanese Patent Application No. 2019-195411 filed on Oct. 28, 2019. The disclosures of each of these applications are hereby incorporated by reference in their entireties.

TECHNICAL FIELD

The present invention relates to an information processing device and a computer readable medium.

RELATED ART

JP-A-2015-026286 discloses a transmissive display device that allows a user to visually recognize an image as a virtual image. The display device includes: a body detection unit that detects a coordinate position and a shape of a real body in a real space; a display control unit that causes an image object having a coordinate position set in the real space to be displayed so as to be visible based on a coordinate system of the real space; and a display unit that displays the image object. The display control unit controls the image object according to the coordinate position and the shape of the real body.

JP-A-2016-122392 discloses an information processing device that outputs a synthesized image obtained by synthesizing a real image representing a real space and a virtual object image in a virtual space to a display device for a user to visually recognize. The information processing device includes: a real body position specifying unit that specifies a position of a real body in the real space; a movement determining unit that determines whether the real body moves based on information on the position of the real body specified by the real body position specifying unit; and an output unit that outputs the synthesized image, obtained by synthesizing the real image and the virtual object image, to be displayed on the display device such that presence or absence of the real body can be recognized, when the movement determining unit determines that the real body moves.

JP-A-2011-186536 discloses an information processing device including: a virtual space recognition unit that recognizes a virtual space by analyzing a three-dimensional space structure of a real space, and obtains position information on a device in the virtual space; a storage unit that stores an object to be arranged in the virtual space and position information of the object; a display unit that causes a display device to display the object arranged in the virtual space; a detection unit that detects device information on the display device; and an execution unit that executes a predetermined processing on the object based on the device information.

SUMMARY

An information processing device that generates mixed reality may require, when a body (for example, a continuous printing device) moves in a real space, setting is required for displaying an associated object (for example, an error message) in a virtual space to be displayed in association with the body, at a position in the virtual space corresponding to a position of the body after movement in the real space.

Aspects of non-limiting embodiments of the present disclosure relate to providing an information processing device and a computer readable medium storing an information processing program capable of reducing setting work for displaying, in a case where a body moves in a real space, an associated object to be displayed in association with the body at a position in a virtual space corresponding to a position of the body after movement in the real space.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including: a processor configured to generate an body object in a virtual space corresponding to a body in a real space, associate an associated object with at least a part of the body object, the associated object being displayed in the virtual space in association with the body, and move, when movement of the body object in the virtual space is detected, the associated object while maintaining a relative positional relationship between the associated object and the body object.

BRIEF DESCRIPTION OF DRAWINGS

Exemplary embodiment(s) of the present invention will be described in detail based on the following figures, wherein:

FIG. 22 shows a table stored in a storage medium according to the third exemplary embodiment;

DETAILED DESCRIPTION

First Exemplary Embodiment

A first exemplary embodiment of an information processing device according to the present invention will be described below.

<Configuration of First Exemplary Embodiment>

Figure 1:
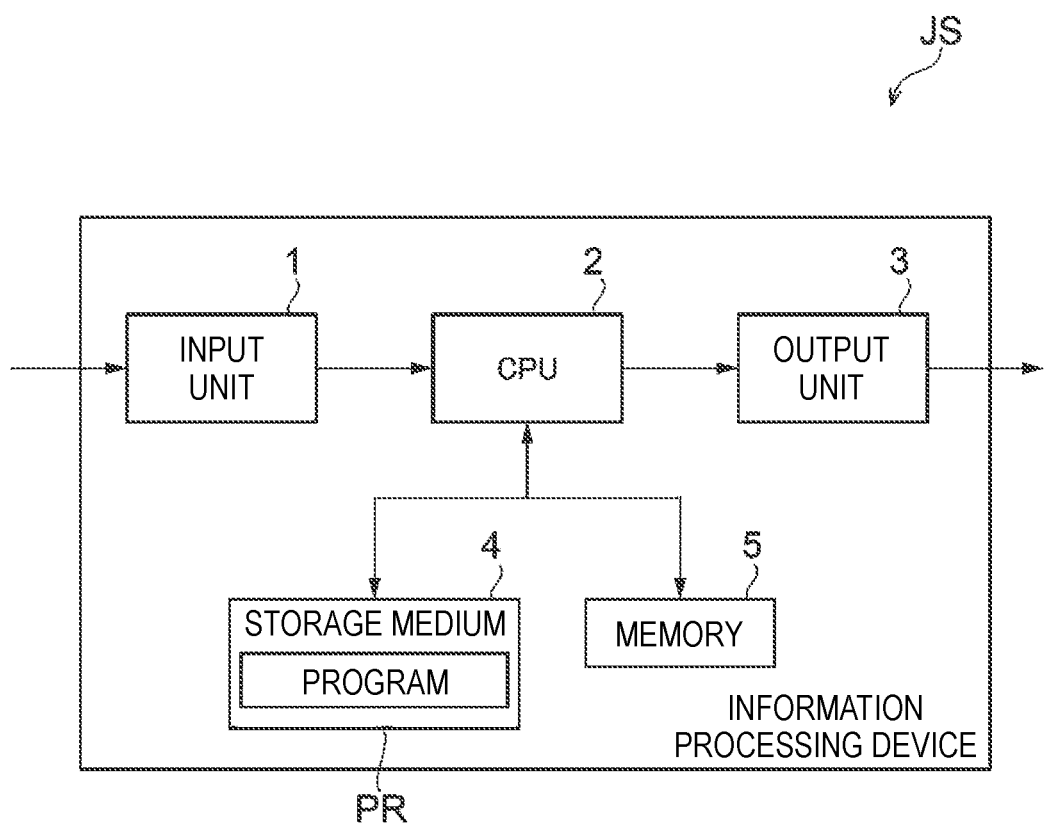
FIG. 1 shows a configuration of an information processing device according to a first exemplary embodiment.

FIG. 1 shows a configuration of an information processing device JS according to a first exemplary embodiment. The information processing device JS according to the present exemplary embodiment is, for example, a mixed reality (MR) device serving as a type of head-mounted display. The information processing device JS combines, that is, superposes a body in a real space GK, for example, a continuous printing device RT (shown in FIG. 3), and an body object in a virtual space KK corresponding to the body, for example, a continuous printing device object RTobj (shown in FIG. 4). Thereby, the information processing device JS generates a mixed space FK (shown in FIG. 5). As shown in FIG. 1, the information processing device JS includes an input unit 1, a central processing unit (CPU) 2, an output unit 3, a storage medium 4 and a memory 5 in order to generate the mixed space FK.

The input unit 1 includes, for example, an image sensor, a camera and a touch panel. The CPU 2 is an example of a processor, and is a core of a well-known computer that operates hardware according to software. The output unit 3 includes, for example, a transmissive display. The storage medium 4 includes, for example, a hard disk drive (HDD), a solid state drive (SSD) and a read only memory (ROM). The memory 5 includes, for example, a dynamic random access memory (DRAM) and a static random access memory (SRAM).

As shown in FIG. 1, the storage medium 4 stores a program PR. The program PR is an instruction group that defines contents of a processing to be executed by the information processing device JS.

Figure 2:
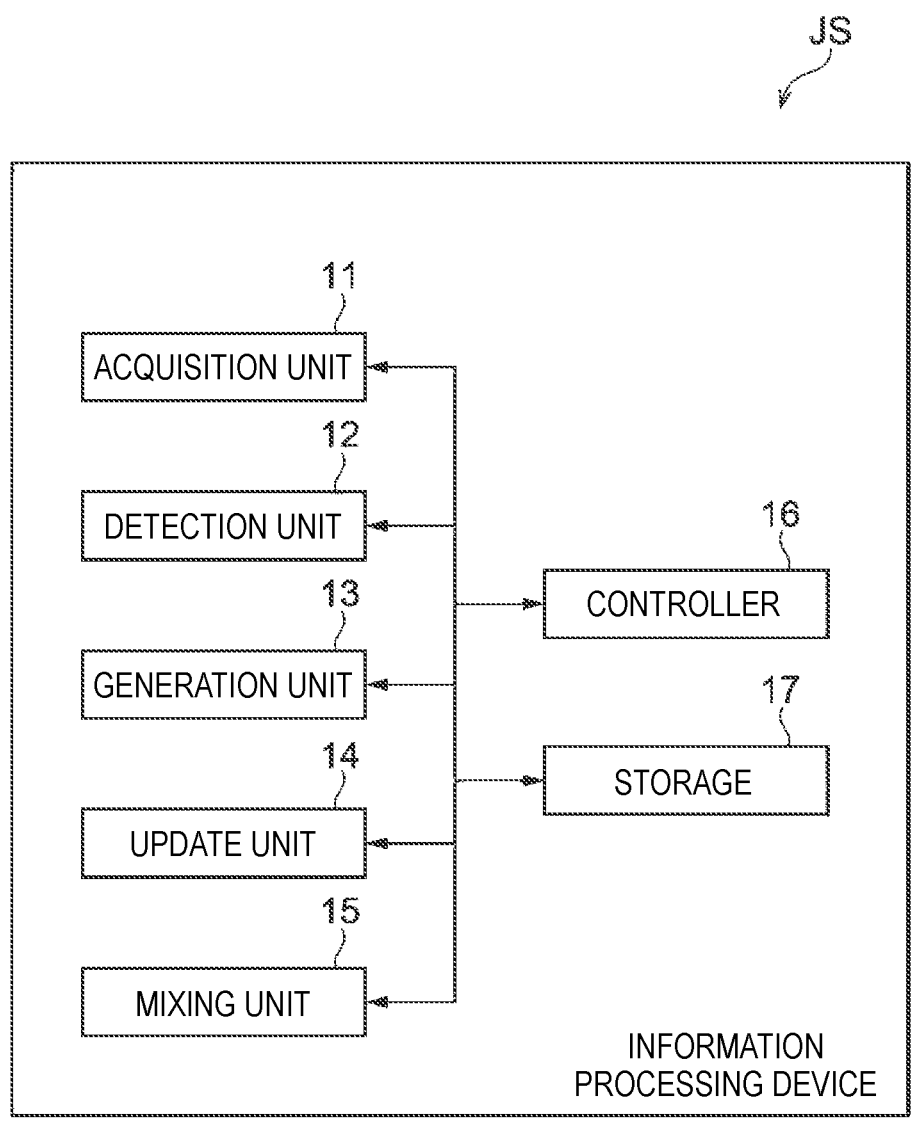
FIG. 2 is a functional block diagram of the information processing device according to the first exemplary embodiment.

FIG. 2 is a functional block diagram of the information processing device JS according to the present exemplary embodiment. As shown in FIG. 2, the information processing device JS according to the present exemplary embodiment includes an acquisition unit 11, a detection unit 12, a generation unit 13, an update unit 14, a mixing unit 15, a control unit 16 and a storage unit 17.

Regarding a relationship between a hardware configuration and a functional configuration in the information processing device JS, based on the hardware, the CPU 2 executes the program PR stored in the storage medium 4 (that implements some functions of the storage unit 17) while using the memory 5 (that implements some other functions of the storage unit 17), and if necessary, serves as the control unit 16 to control operation of the input unit 1 and the output unit 3, thereby implementing functions of units including the acquisition unit 11, the detection unit 12, the generation unit 13, the update unit 14 and the mixing unit 15. The functions of the units will be described below.

The CPU 2 may implement the units by, for example, an external server (not shown) instead of implementing in the information processing device JS.

Figure 3:
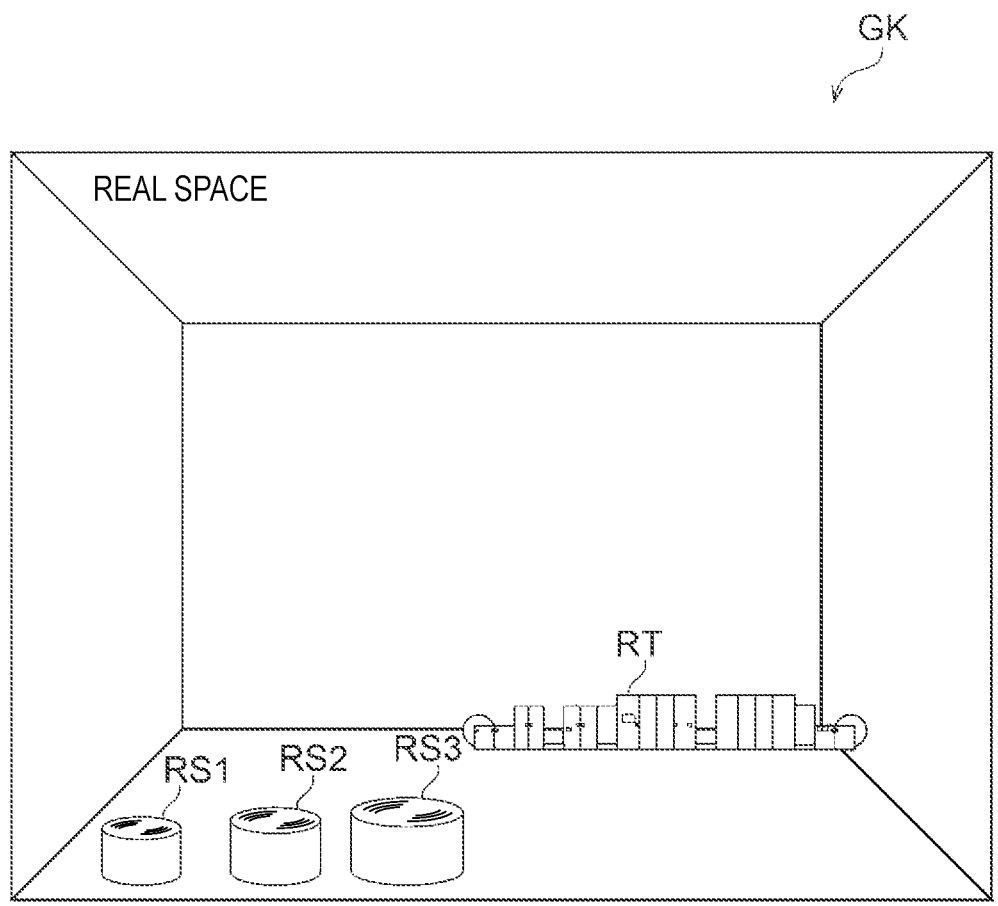
FIG. 3 shows an example of a real space according to the first exemplary embodiment.
Figure 4:
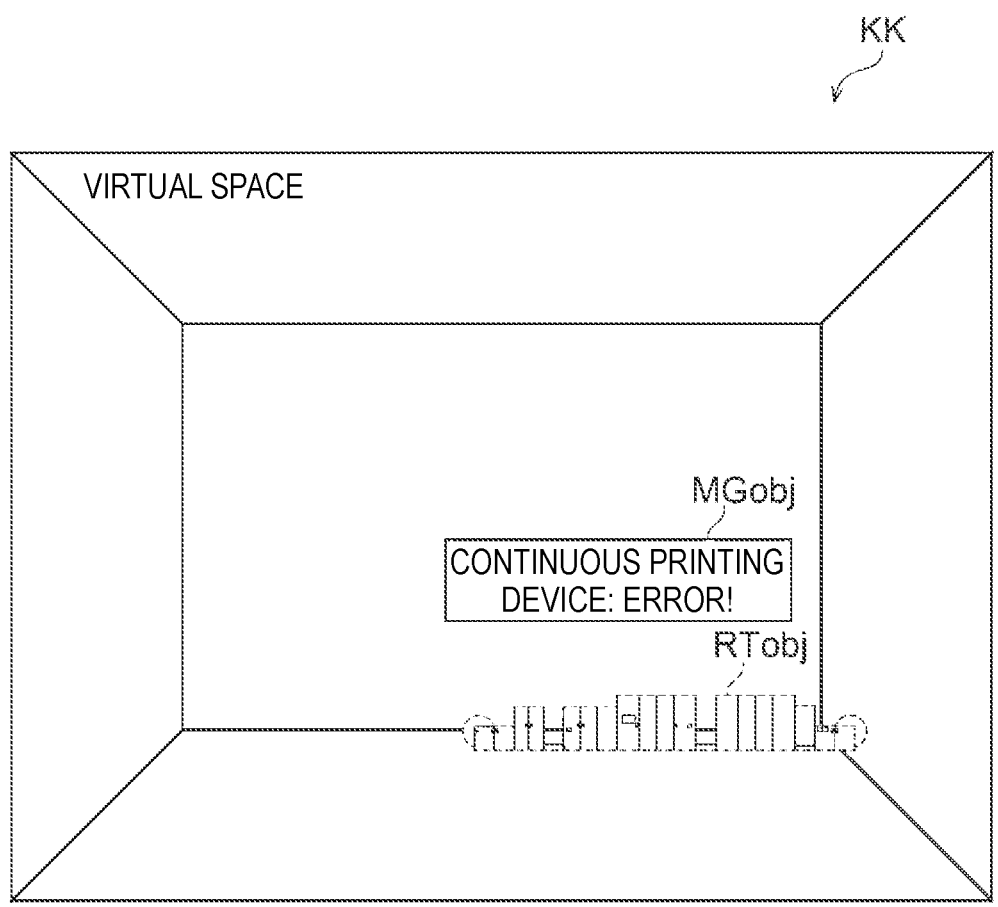
FIG. 4 shows an example of a virtual space according to the first exemplary embodiment.
Figure 5:
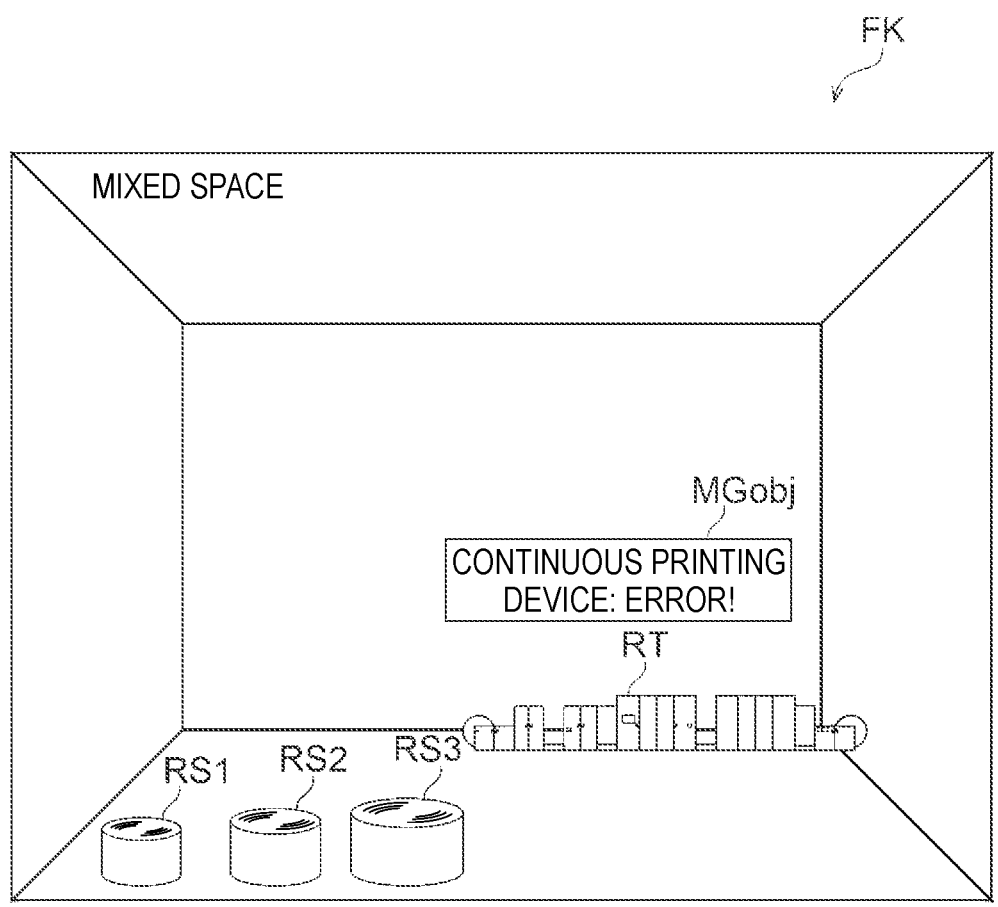
FIG. 5 shows an example of a mixed space according to the first exemplary embodiment.

FIG. 3 shows an example of the real space GK according to the present exemplary embodiment. FIG. 4 shows an example of the virtual space KK according to the present exemplary embodiment. FIG. 5 shows an example of the mixed space FK according to the present exemplary embodiment.

The real space GK is a real space. In the real space Gk as shown in FIG. 3, there is, for example, the continuous printing device RT and plural roll papers RS1 to RS3, which are bodies.

The virtual space KK is a virtual space generated by the information processing device JS. In the virtual space KK as shown in FIG. 4, there is a virtual object corresponding to the continuous printing device RT in the real space GK, that is, the continuous printing device object RTobj serving as the body object, and an associated object serving as a virtual object to be displayed in association with the continuous printing device RT in the real space GK, that is, a message object MGobj, which are generated by the information processing device JS.

As will be described below, the continuous printing device object RTobj is used by the information processing device JS to calculate a coordinate position of the message object MGobj, the continuous printing device object RTobj is not required to be visible for a user of the information processing device JS, and is invisible.

On the other hand, the message object MGobj is desired to be visible so as to be used for operation by the user of the information processing device JS. In addition, the coordinate position of the message object MGobj in the virtual space KK is specified by a relative relationship with a coordinate position of the continuous printing device object RTobj in the virtual space KK.

For example, assuming that the coordinate position of the continuous printing device object RTobj in the virtual space KK is (xa, yb, zc) (not shown), the coordinate position of the message object MGobj in the virtual space KK is specified by (xa, yb+m, zc). Here, m is any numerical value. In the following description, it is assumed that m=5.

In the following description, an object whose outline is drawn by "dotted line" means "invisible".

The information processing device JS generates the mixed space FK (shown in FIG. 5) by mixing, that is, superposing the continuous printing device RT and the plural roll papers RS1 to RS3 in the real space GK (shown in FIG. 3), with the continuous printing device object RTobj and the message object MGobj in the virtual space KK (shown in FIG. 4). The mixed space FK is a space recognized by the user through the transmissive display that is the output unit 3 described above. In the generated mixed space FK, there is the continuous printing device RT, the plural roll papers RS1 to RS3 and the message object MGobj, which are visible for the user of the information processing device JS. That is, in the mixed space FK, the continuous printing device object RTobj is invisible for the user of the information processing device JS.

<Operation of First Exemplary Embodiment>

Figure 6:
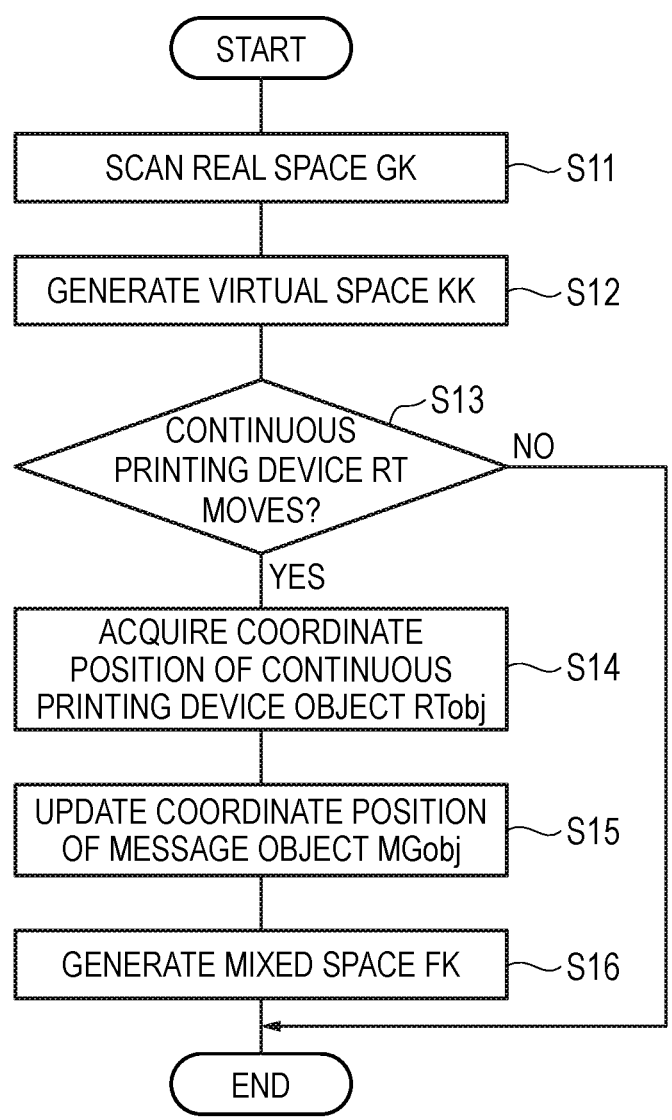
FIG. 6 is a flowchart showing operation of the information processing device according to the first exemplary embodiment.
Figure 7:
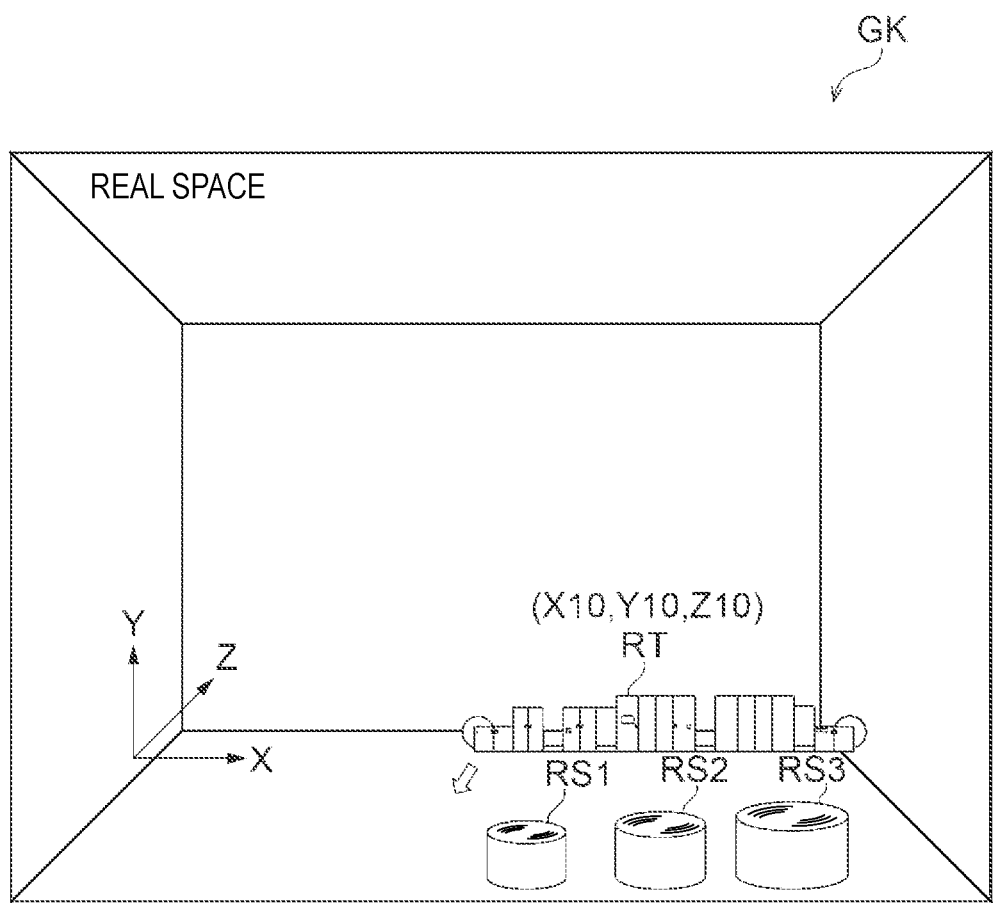
FIG. 7 shows an example of the real space (before movement) according to the first exemplary embodiment.
Figure 8:
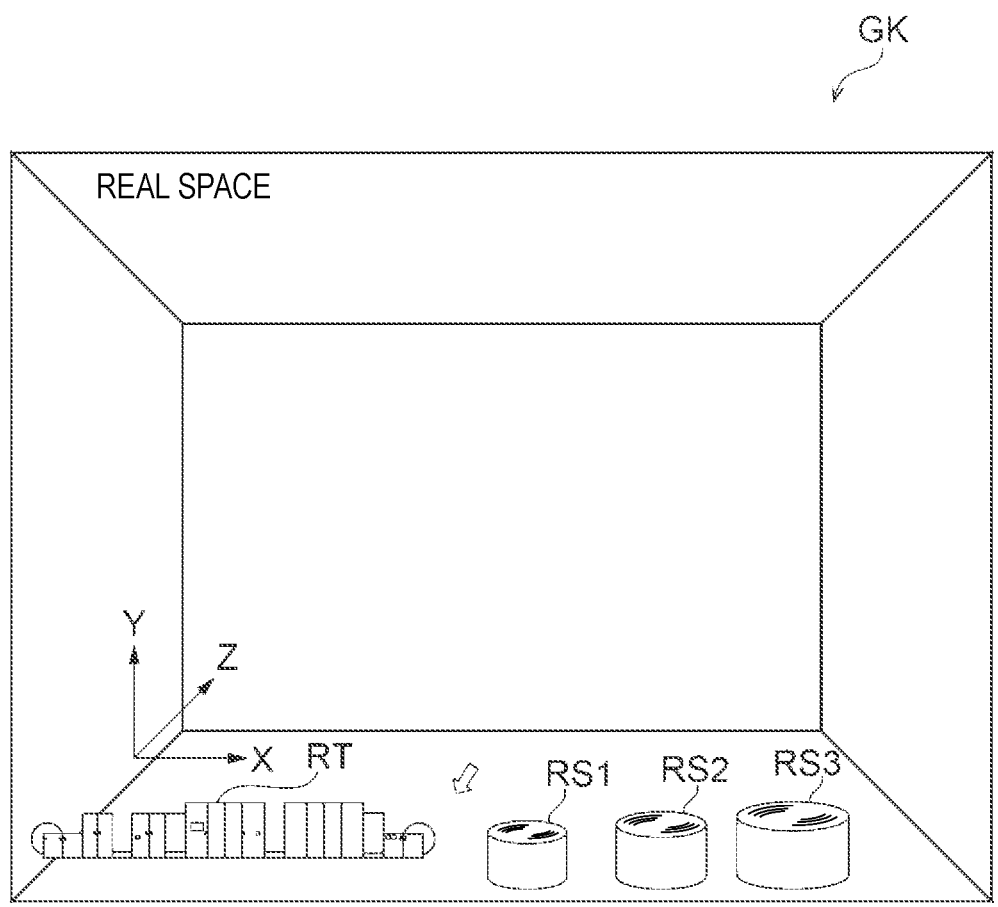
FIG. 8 shows an example of the real space (after movement) according to the first exemplary embodiment.

FIG. 6 is a flowchart showing operation of the information processing device JS according to the present exemplary embodiment. FIG. 7 shows an example of the real space (before movement) according to the present exemplary embodiment. FIG. 8 shows an example of the real space (after movement) according to the present exemplary embodiment.

Figure 9:
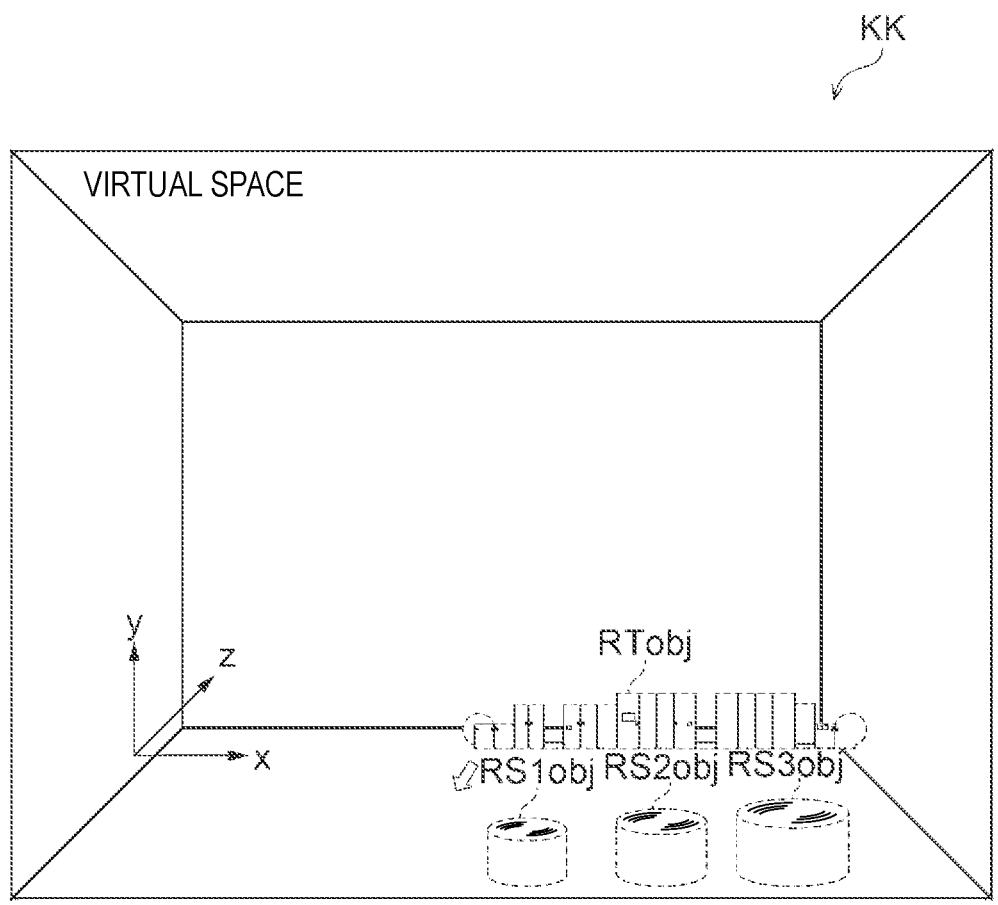
FIG. 9 shows an example of the virtual space (before movement) according to the first exemplary embodiment.
Figure 10:
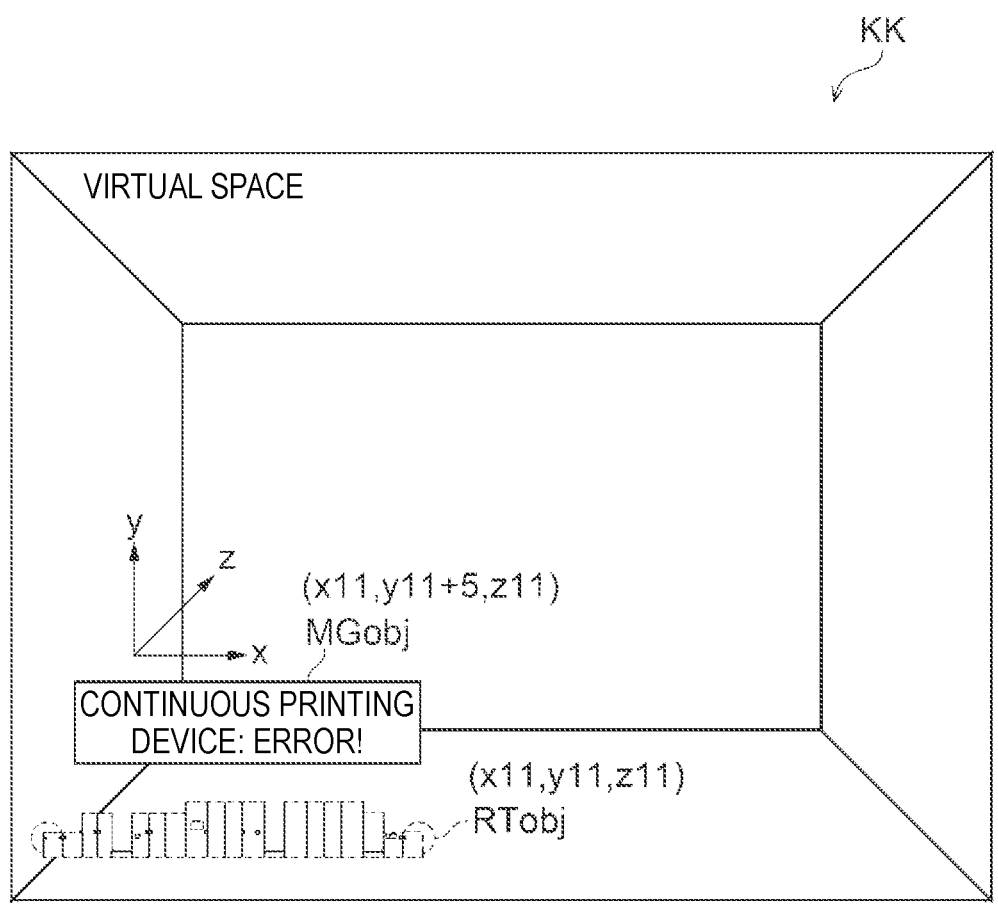
FIG. 10 shows an example of the virtual space (after movement) according to the first exemplary embodiment.
Figure 11:
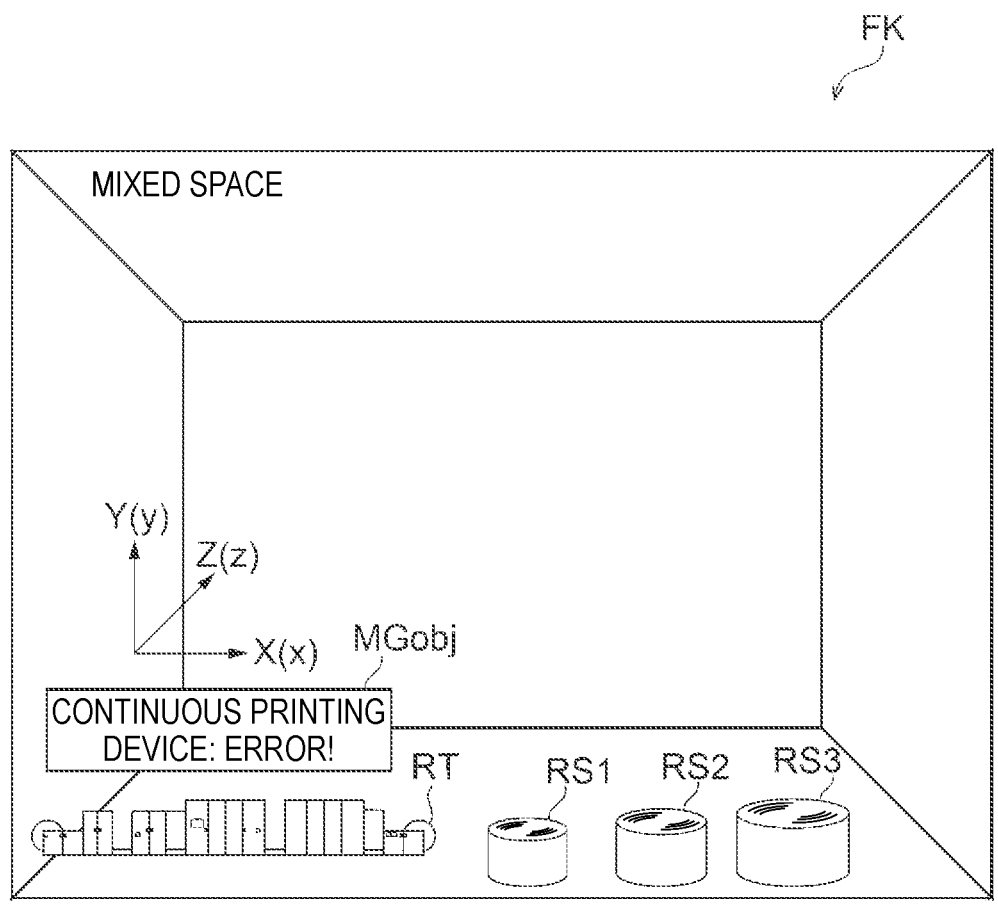
FIG. 11 shows an example of the mixed space (after movement) according to the first exemplary embodiment.

FIG. 9 shows an example of the virtual space (before movement) according to the present exemplary embodiment. FIG. 10 shows an example of the virtual space (after movement) according to the present exemplary embodiment. FIG. 11 shows an example of the mixed space (after movement) according to the present exemplary embodiment.

Hereinafter, the operation of the information processing device JS according to the present exemplary embodiment will be described with reference to the flowchart shown in FIG. 6, and FIGS. 7 to 11.

For easy description and understanding, it is assumed that only the continuous printing device RT moves in the real space GK. It is assumed that the user specifies in advance that the message object MGobj to be displayed in association with the continuous printing device RT, in other words, to be displayed in vicinity of the continuous printing device RT, should be displayed in vicinity of the continuous printing device object RTobj (at the coordinate position of +5 in a y-axis direction) in the mixed space FK.

[Step S11] In the information processing device JS, the CPU 2 (shown in FIG. 1) serves as the acquisition unit 11 (shown in FIG. 2) to scan the real space GK shown in FIG. 7 by a known method in related art, that is, captures an image using the input unit 1 that is a camera, for example. More specifically, the CPU 2 acquires shapes (outer shapes) and coordinate positions of the continuous printing device RT and the plural roll papers RS1 to RS3 in the real space GK along a Z-axis direction in the real space GK.

Here, the CPU 2 acquires, for example, a shape "shape long in an X-axis direction" of the continuous printing device RT. The CPU 2 also acquires, for example, a coordinate position (X10, Y10, Z10) of the continuous printing device RT in the real space GK. The CPU 2 also acquires the shapes (the outer shapes) and the coordinate positions of the plural roll papers RS1 to RS3, similarly to the continuous printing device RT.

[Step S12] When the shape "shape long in the X-axis direction" and the coordinate position (X10, Y10, Z10) of the continuous printing device RT, and the shapes and the coordinate positions of the plural roll papers RS1 to RS3 are acquired in step S11, the CPU 2 serves as the generation unit 13 (shown in FIG. 2) to generate the virtual space KK as shown in FIG. 9.

The virtual space KK includes objects corresponding to all bodies acquired by the scanning in step S11. More specifically, the virtual space KK includes the continuous printing device object RTobj serving as an object corresponding to the continuous printing device RT, and a plural roll paper objects RS1obj to R3obj serving as objects corresponding to the plural roll papers RS1 to RS3.

The continuous printing device object RTobj is associated with the continuous printing device RT, and has, for example, information such as the shape (including a similar shape), the coordinate position, an IP address and a model name of the continuous printing device RT.

Similarly, the plural roll paper objects RS1obj to R3obj are respectively associated with the plural roll papers RS1 to RS3, and has information such as the shapes (including similar shapes), the coordinate positions and product names of the plural roll papers RS1 to RS3.

The CPU 2 also serves as the generation unit 13 to generate an association that the message object MGobj (not shown in FIG. 9) is associated with at least a part of the continuous printing device object RTobj.

[Step S13] When the virtual space KK is generated in step S12, the CPU 2 serves as the detection unit 12 (shown in FIG. 2) to detect whether the continuous printing device RT and the plural roll papers RS1 to RS3, which are the bodies in the real space GK, move. Here, as described above, the continuous printing device RT moves as indicated by a white arrow in FIGS. 7 and 8. As a result, the CPU 2 detects a fact that the shape "shape long in the X-axis direction" moves, in other words, detects a fact that the continuous printing device RT moves, and thus the processing proceeds to "YES".

[Step S14] When the movement of the continuous printing device RT in the real space GK is detected in step S13, the CPU 2 serves as the acquisition unit 11 to acquire a coordinate position (x11, y11, z11) of the continuous printing device object RTobj in the virtual space KK as shown in FIG. 10.

Here, the continuous printing device object RTobj is moved by the CPU 2 in conjunction with the movement of the continuous printing device RT. Instead of moving in conjunction with the movement of the continuous printing device RT as described above, the continuous printing device object RTobj may be arranged at a position desired by the user by manual operation of the user, for example, an input of a coordinate position. The continuous printing device object RTobj may also be arranged at a position desired by the user while being moved along with the movement of the continuous printing device RT by combining the two methods of moving the continuous printing device object RTobj in conjunction with the movement of the continuous printing device RT as described above, and manually adjusting the coordinate position by the user.

[Step S15] When the coordinate position (x11, y11, z11) of the continuous printing device object RTobj in the virtual space KK is detected in step S14, the CPU 2 serves as the update unit 14 (as shown in FIG. 2) to perform update, that is, updates the coordinate position of the message object MGobj in the virtual space KK based on the coordinate position (x11, y11, z11) of the continuous printing device object RTobj after movement for specification as shown in FIG. 10. Thereby, the CPU 2 acquires the coordinate position (x11, y11+5, z11) of the message object MGobj. In other words, the CPU 2 arranges the message object MGobj at a coordinate position (x11, y11+5, z11) in the virtual space KK, that is, moves the message object MGobj while maintaining a relative positional relationship between the continuous printing device object RTobj and the message object MGobj.

Here, instead of updating the coordinate position of the message object MGobj by the CPU 2, manual operation of the user, for example, an input of a coordinate position may also be performed together with the update of the coordinate position by the CPU 2. Thereby, instead of the coordinate position (x11, y11+5, z11) described above, the coordinate position (x11, y11+5, z11) described above of the message object MGobj may be adjusted, for example, may be arranged at coordinate positions (x11, y11+7, z11) and (x11−3, y11+5, z11).

[Step S16] When the coordinate position (x11, y11+5, z11) of the message object MGobj in the virtual space KK is acquired in step S15, the CPU 2 serves as the mixing unit 15 (shown in FIG. 2) to generate the mixed space FK shown in FIG. 11 by mixing the continuous printing device RT and the plural roll papers RS1 to RS3 in the real space GK (shown in FIG. 8), with the continuous printing device object RTobj and the message object MGobj in the virtual space KK (shown in FIG. 10).

In the generated mixed space FK, there is the continuous printing device RT, the plural roll papers RS1 to RS3 and the message object MGobj, which are visible; and the continuous printing device object RTobj, which is invisible (the invisible continuous printing device object RTobj is not shown in FIG. 11).

In the first exemplary embodiment, setting work for displaying the message object MGobj in the virtual space KK is reduced when the continuous printing device RT moves in the real space GK as described above. That is, the coordinate position of the message object MGobj in the virtual space KK is immediately specified based on the coordinate position of continuous printing device object RTobj in the virtual space KK.

Second Exemplary Embodiment

An information processing device according to a second exemplary embodiment will be described.

Configuration of Second Exemplary Embodiment

A configuration of the information processing device JS according to the present exemplary embodiment is the same as that of the information processing device JS according to the first exemplary embodiment shown in FIGS. 1 and 2.

Operation of Second Exemplary Embodiment

Different from the information processing device JS according to the first exemplary embodiment, the information processing device JS according to the present exemplary embodiment displays an associated object "arrow object YJobj" (for example, shown in FIG. 13) instead of displaying the associated object "message object MGobj" (for example, shown in FIG. 4).

Figure 12:
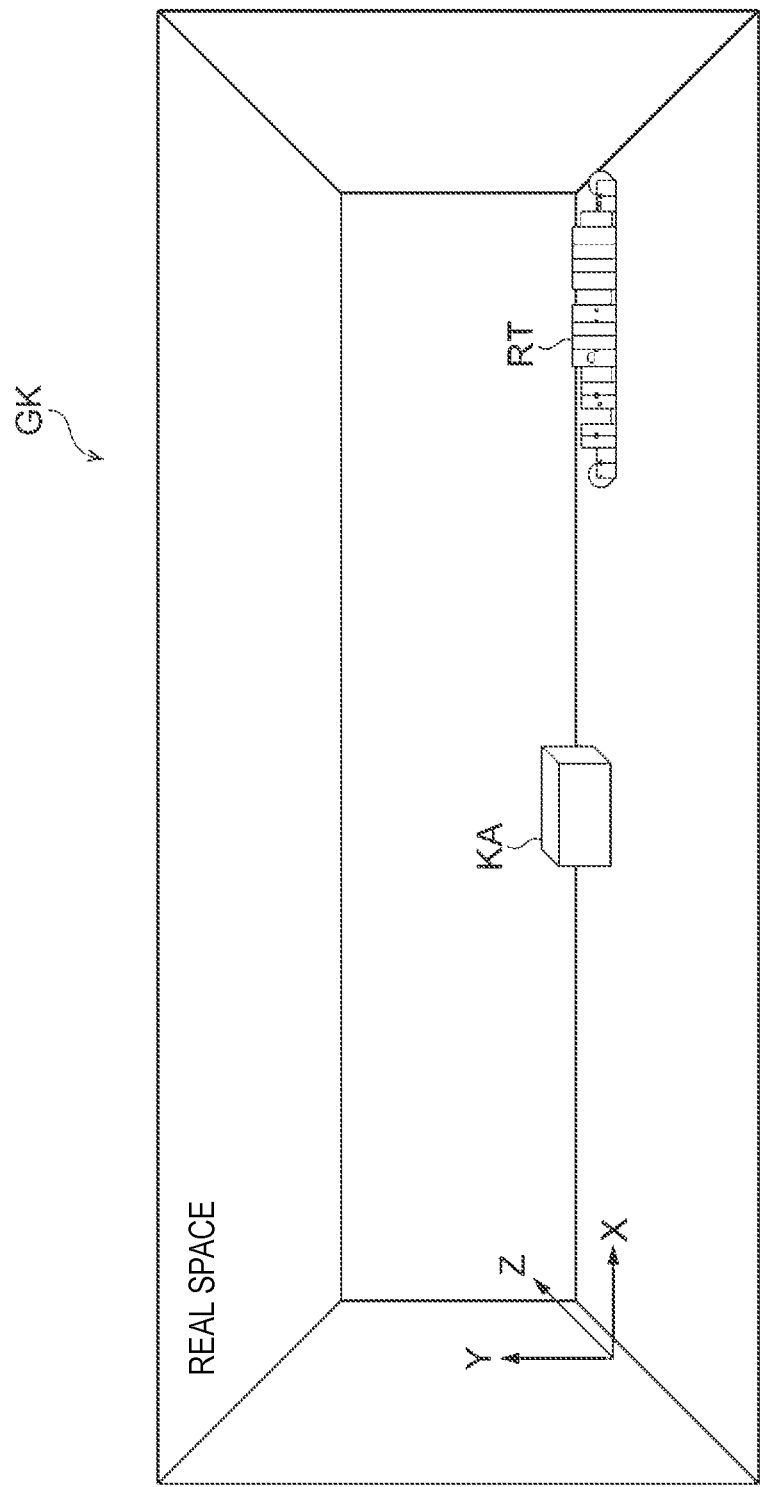
FIG. 12 shows an example of a real space according to a second exemplary embodiment.
Figure 13:
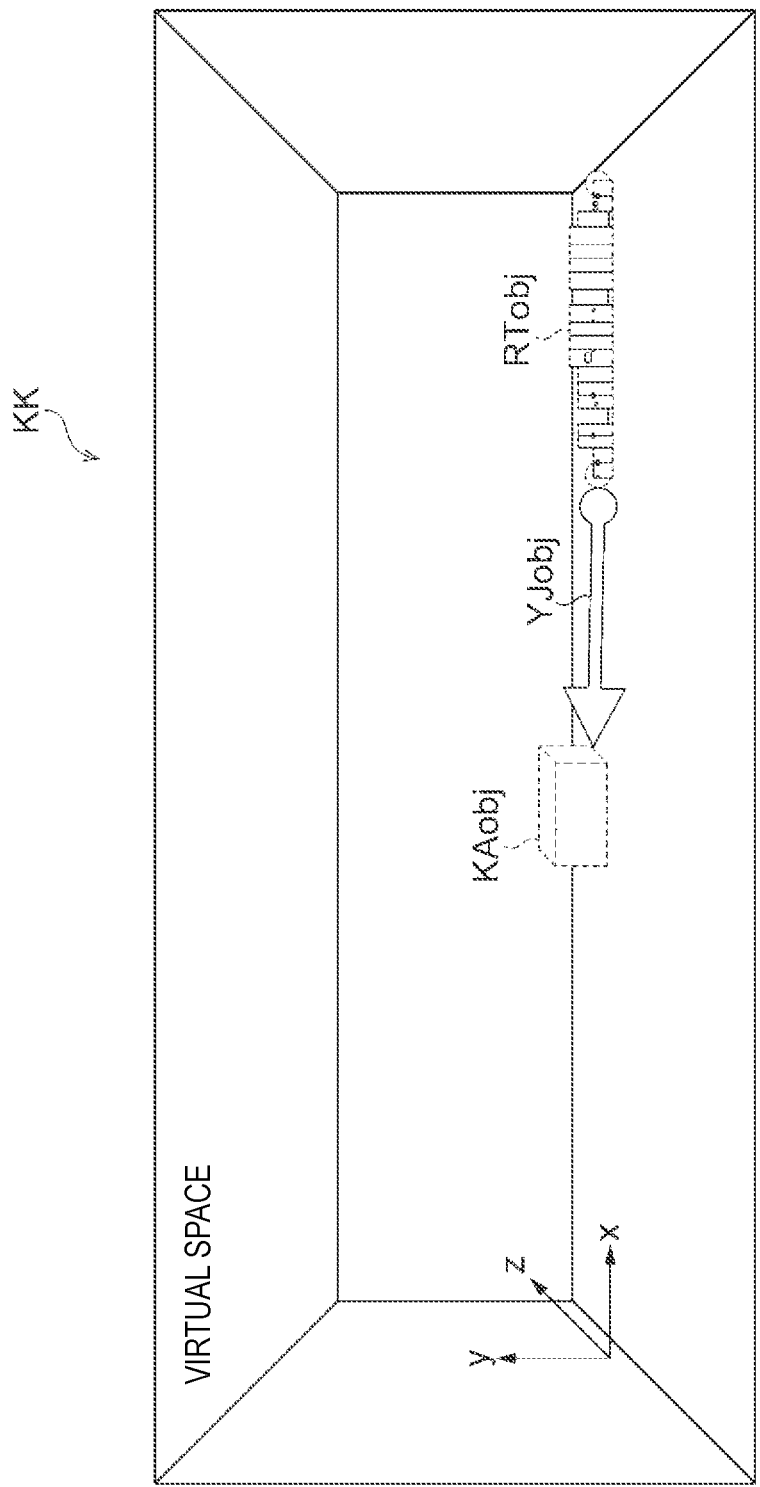
FIG. 13 shows an example of a virtual space according to the second exemplary embodiment.
Figure 14:
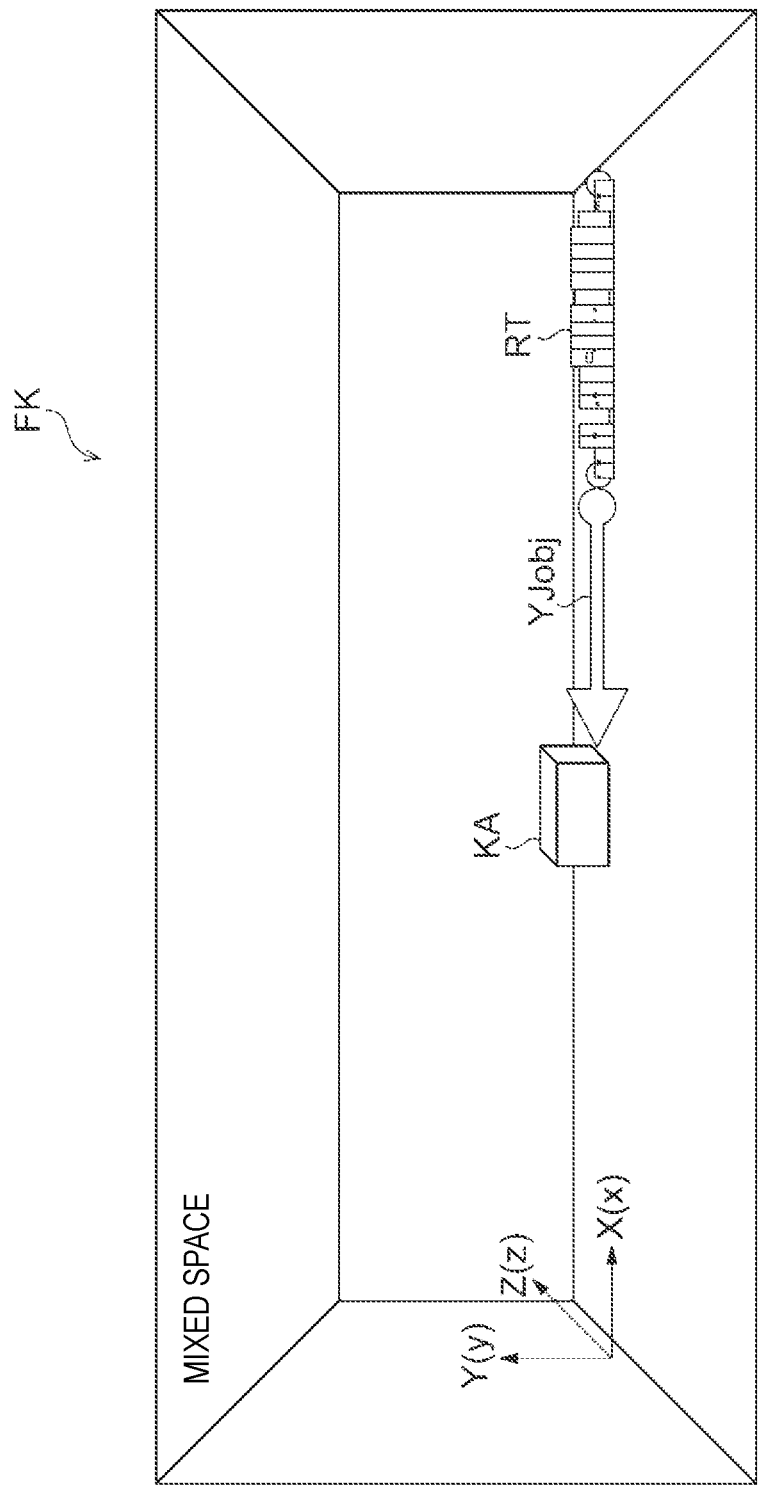
FIG. 14 shows an example of a mixed space according to the second exemplary embodiment.

FIG. 12 shows an example of a real space according to the present exemplary embodiment. FIG. 13 shows an example of a virtual space according to the present exemplary embodiment. FIG. 14 shows an example of a mixed space according to the present exemplary embodiment.

In the real space GK according to the present exemplary embodiment as shown in FIG. 12, there is the continuous printing device RT as a body and a processing device KA as another body.

In the virtual space KK according to the present exemplary embodiment as shown in FIG. 13, there is a virtual object corresponding to the continuous printing device RT, that is, the continuous printing device object RTobj as a body object, which is generated by the information processing device; a virtual object corresponding to the processing device KA, that is, a processing device object KAobj as another body object, which is generated by the information processing device JS; and the arrow object YJobj as the associated object, which is generated by the information processing device JS.

Since the continuous printing device object RTobj and a roll paper object RSobj are used by the information processing device JS to calculate a coordinate position of the arrow object YJobj, the continuous printing device object RTobj and a roll paper object RSobj are not required to be visible for a user of the information processing device JS, and are invisible. The arrow object YJobj is an object indicating a direction from the continuous printing device RT serving as a start point in the real space GK to the processing device KA serving as an end point in the real space GK. The arrow object YJobj is desired to be visible for convenience of the user of the information processing device JS. A start point of the arrow object YJobj is specified by the coordinate position of the continuous printing device object RTobj, and an end point of the arrow object YJobj is specified by a coordinate position of the processing device object KAobj.

The information processing device JS generates the mixed space FK (as shown in FIG. 14) where there is the continuous printing device RT, the processing device KA and the arrow object YJobj, which are visible; and the continuous printing device object RTobj and the processing device object KAobj, which are invisible, by mixing the continuous printing device RT and the processing device KA in the real space GK (shown in FIG. 12), with the continuous printing device object RTobj, the processing device object KAobj and the arrow object YJobj in the virtual space KK (shown in FIG. 13). That is, in the mixed space FK, the continuous printing device object RTobj and the processing device object KAobj are invisible for the user of the information processing device JS.

Figure 15:
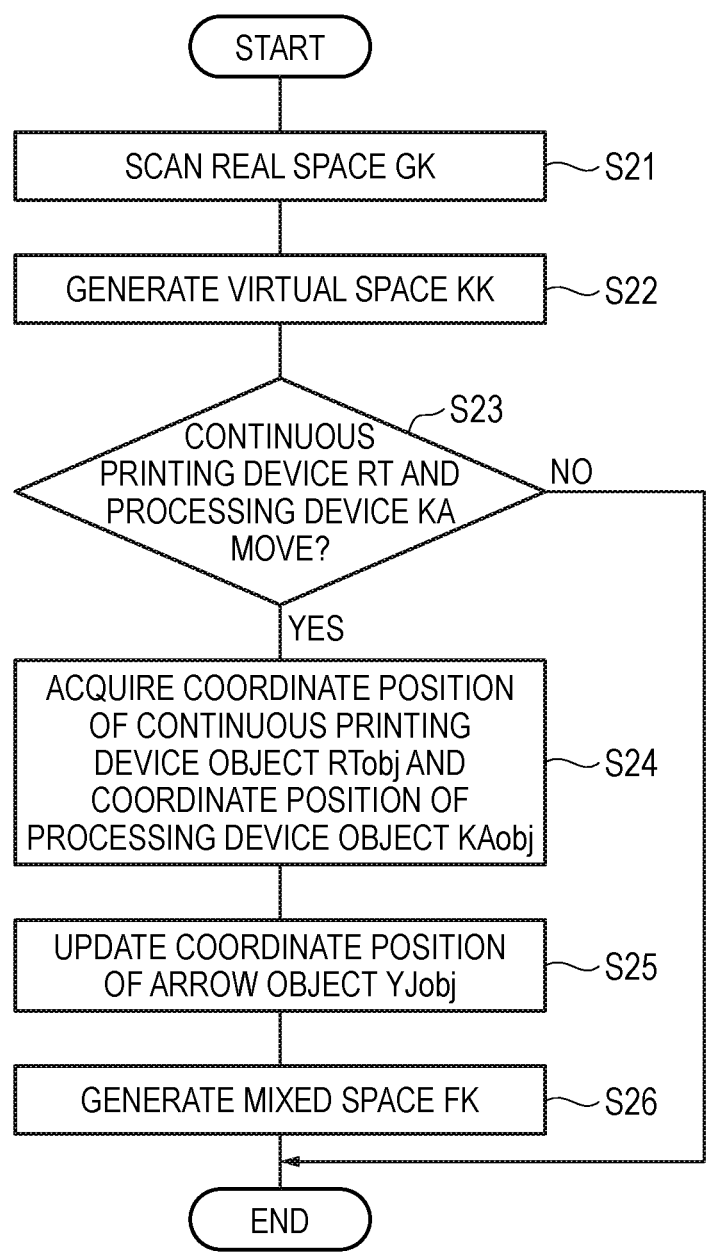
FIG. 15 is a flowchart showing operation of an information processing device according to the second exemplary embodiment.
Figure 16:
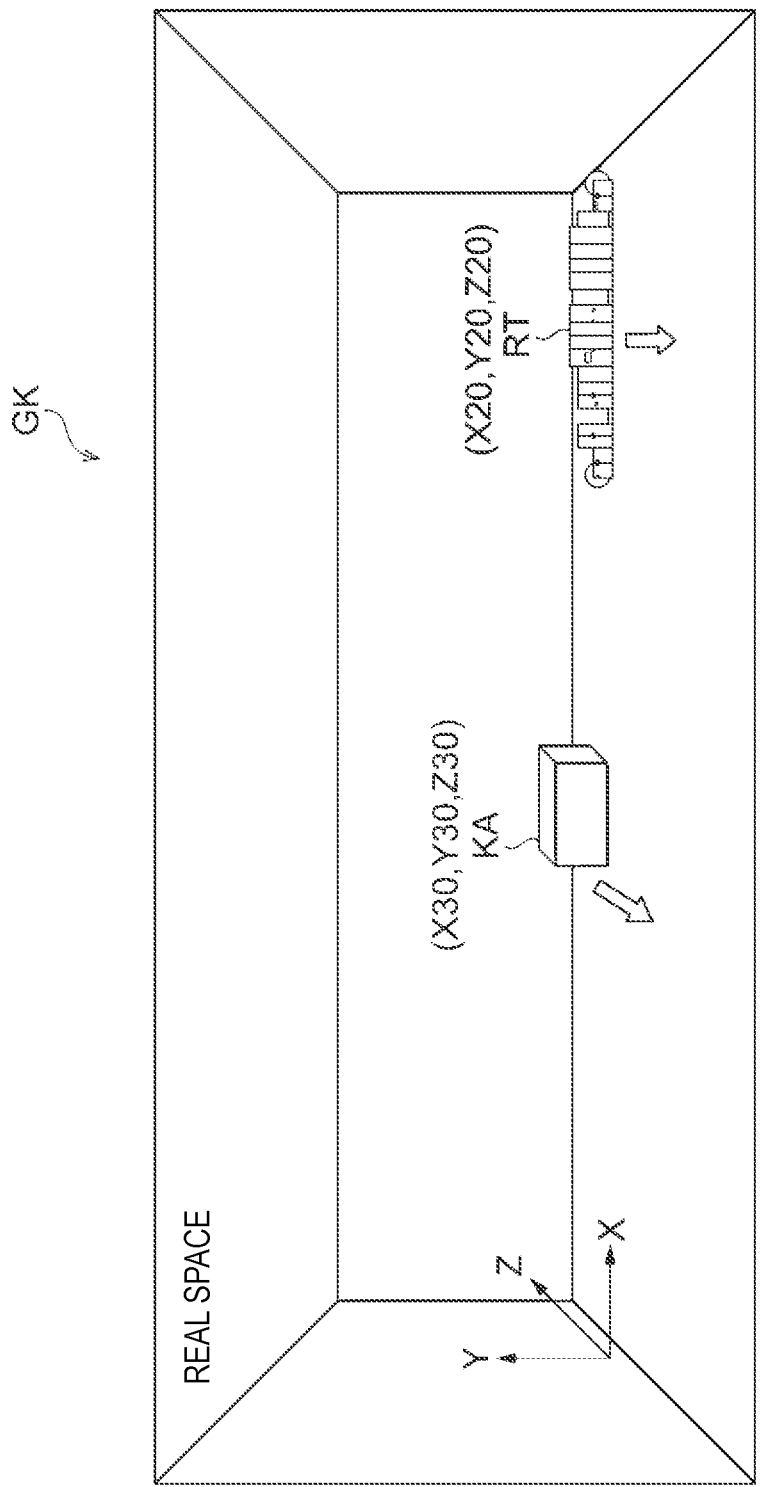
FIG. 16 shows an example of the real space (before movement) according to the second exemplary embodiment.
Figure 17:
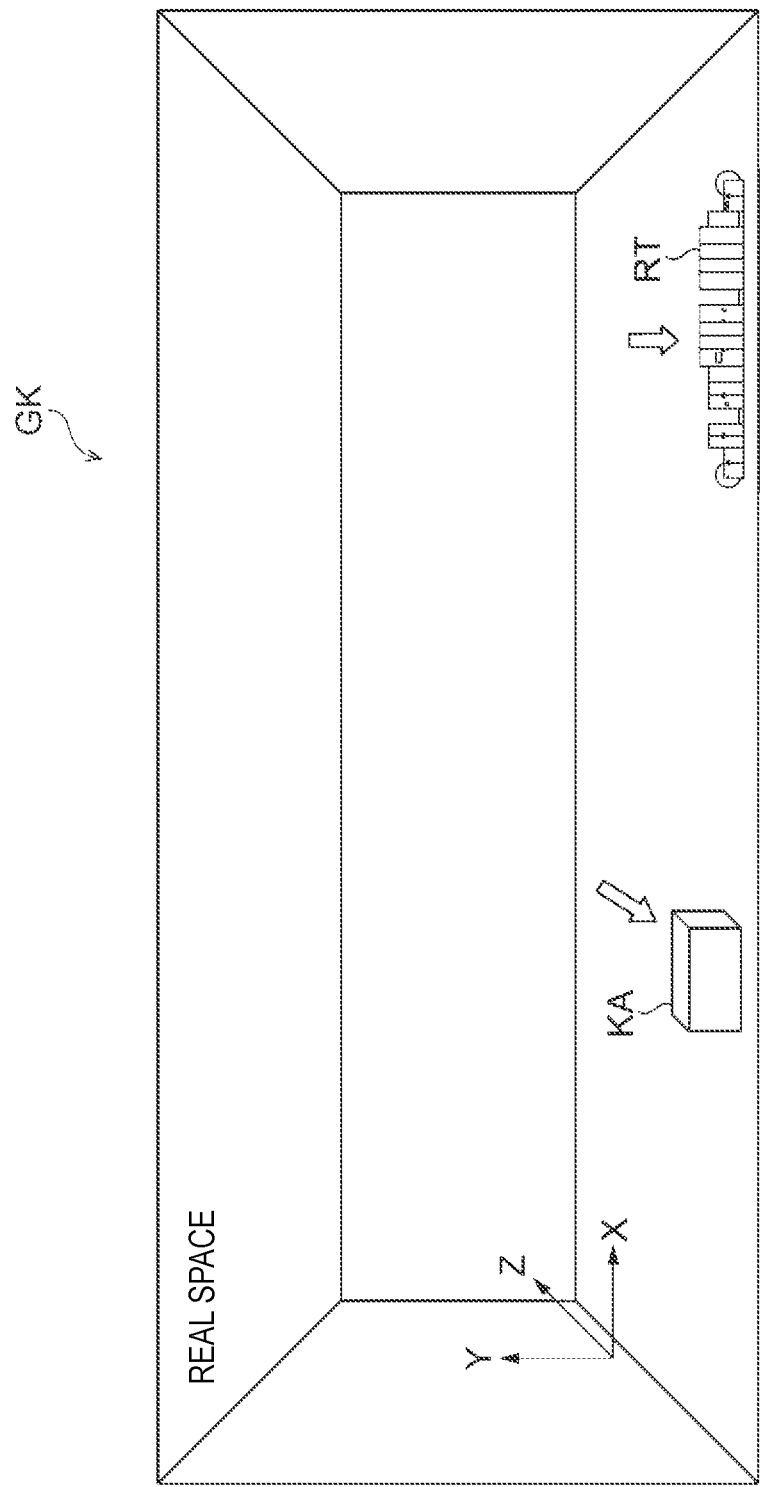
FIG. 17 shows an example of the real space (after movement) according to the second exemplary embodiment.
Figure 18:
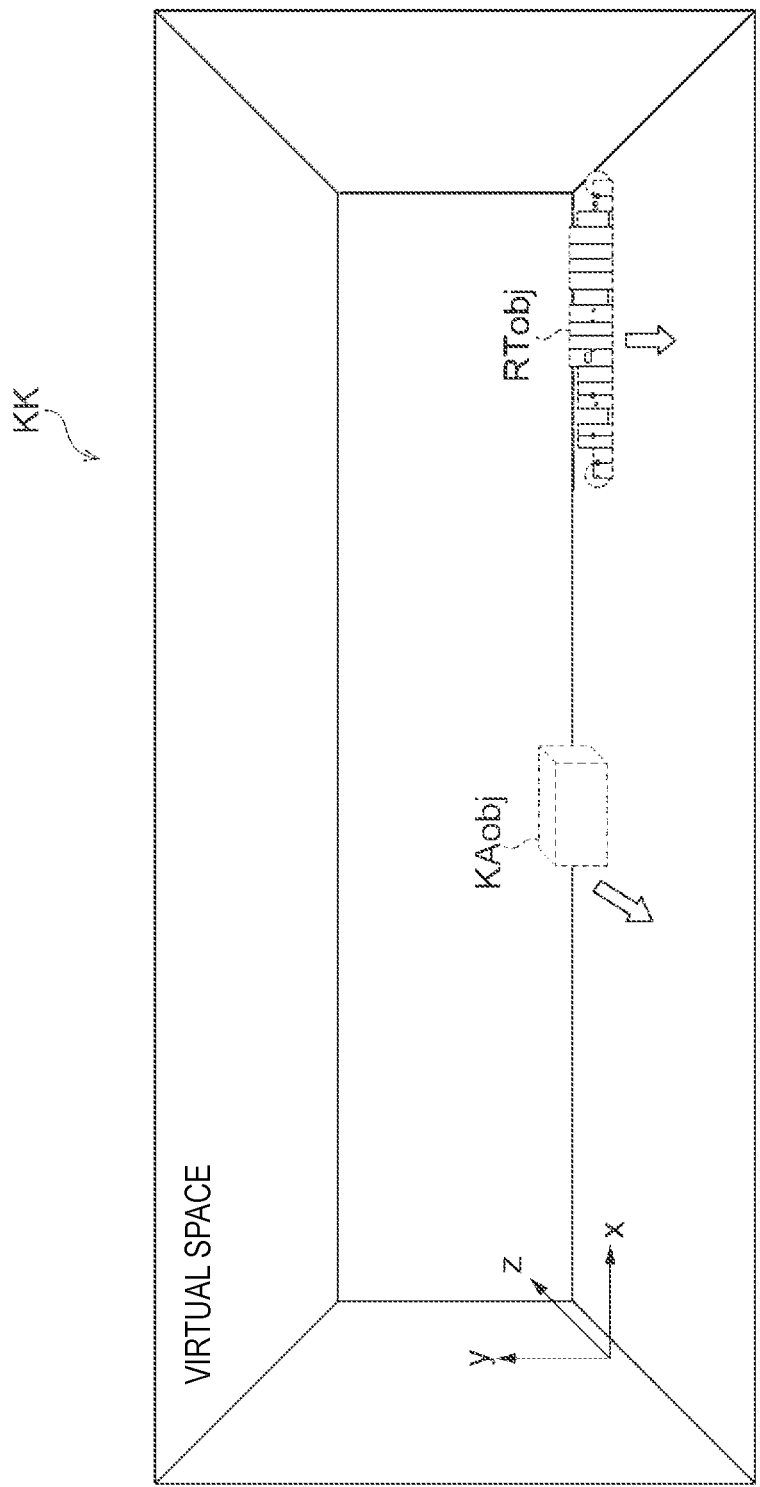
FIG. 18 shows an example of the virtual space (before movement) according to the second exemplary embodiment.
Figure 19:
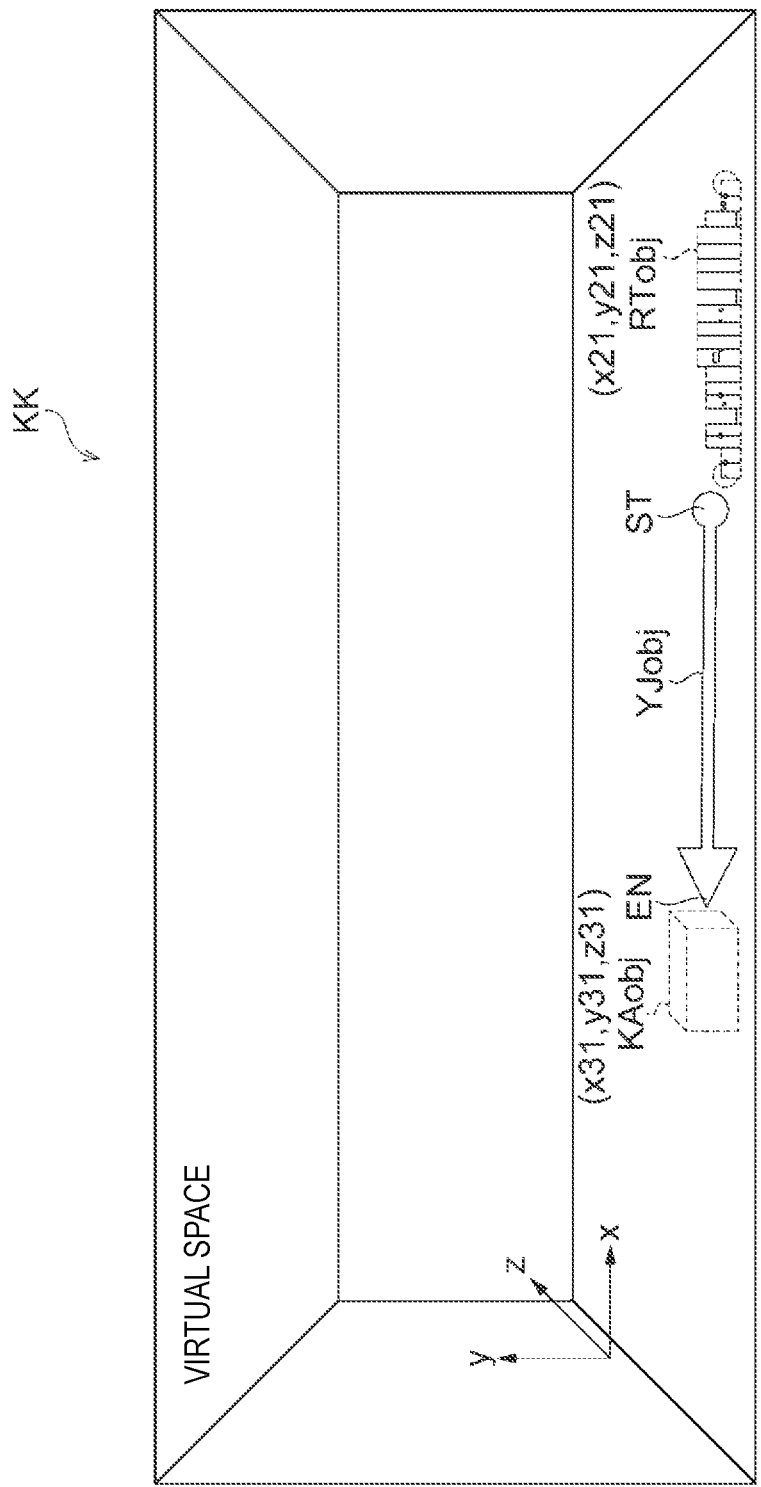
FIG. 19 shows an example of the virtual space (after movement) according to the second exemplary embodiment.
Figure 20:
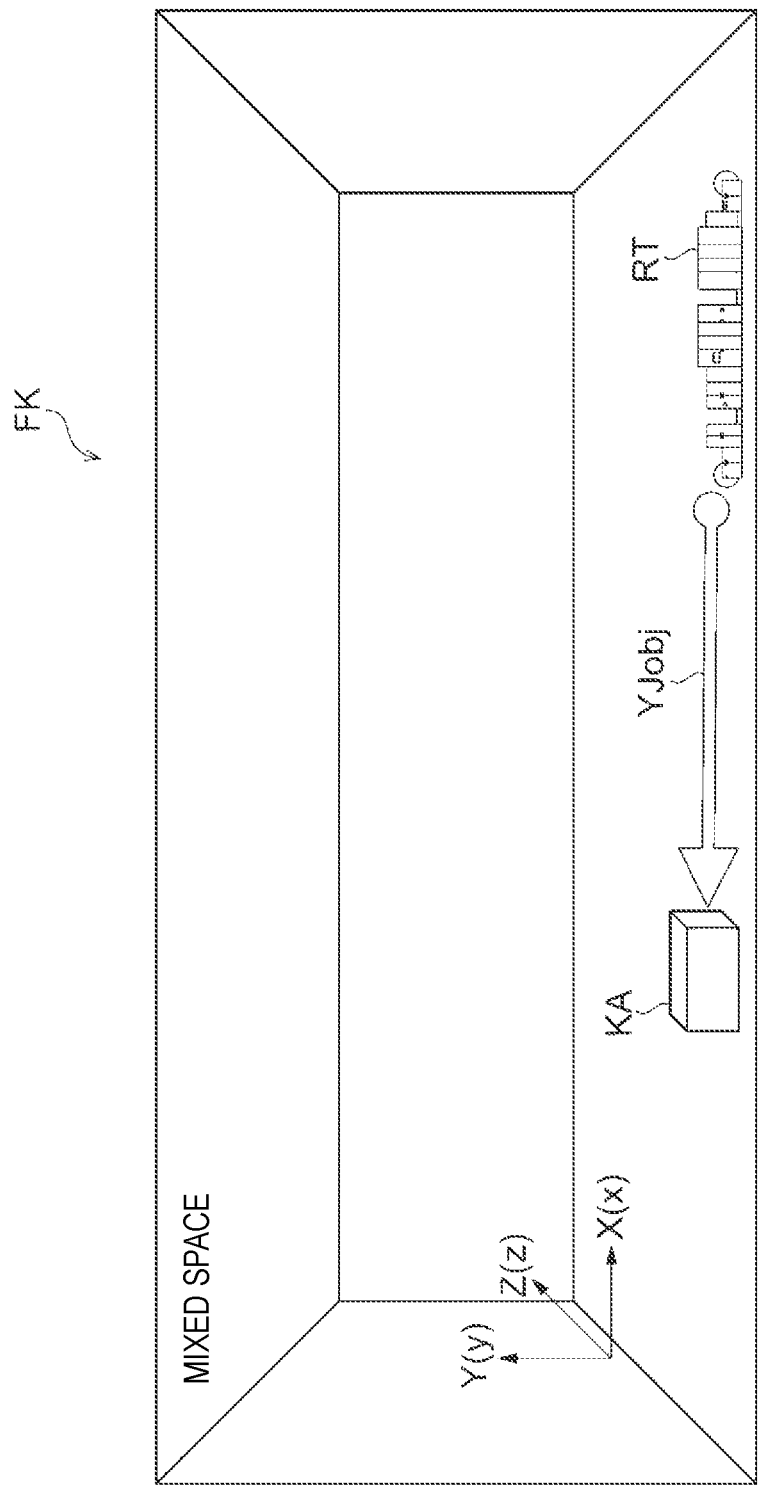
FIG. 20 shows an example of the mixed space (after movement) according to the second exemplary embodiment.

FIG. 15 is a flowchart showing operation of the information processing device JS according to the present exemplary embodiment. FIG. 16 shows an example of the real space (before movement) according to the present exemplary embodiment. FIG. 17 shows an example of the real space (after movement) according to the present exemplary embodiment. FIG. 18 shows an example of the virtual space (before movement) according to the present exemplary embodiment. FIG. 19 shows an example of the virtual space (after movement) according to the present exemplary embodiment. FIG. 20 shows an example of the mixed space (after movement) according to the present exemplary embodiment.

Hereinafter, the operation of the information processing device JS according to the present exemplary embodiment will be described with reference to the flowchart shown in FIG. 15, and FIGS. 16 to 20.

For easy description and understanding, it is assumed that the continuous printing device RT and the processing device KA move in the real space GK and the arrow object YJobj needs to be moved together with these movements.

[Step S21] In the information processing device JS, the CPU 2 (shown in FIG. 1) serves as the acquisition unit 11 (shown in FIG. 2) to scan the real space GK shown in FIG. 16, as in step S11 of the first exemplary embodiment. More specifically, the CPU 2 acquires shapes (outer shapes) and coordinate positions of the continuous printing device RT and the processing device KA in the real space GK along a Z-axis direction in the real space GK. Here, the CPU 2 acquires, for example, a shape "shape long in an X-axis direction" and a coordinate position (X20, Y20, Z20) of the continuous printing device RT. The CPU 2 acquires, for example, a shape "rectangular parallelepiped long in the X-axis direction" and a coordinate position (X30, Y30, Z30) of the processing device KA.

[Step S22] When the shape "shape long in the X axis direction" and the coordinate position (X20, Y20, Z20) of the continuous printing device RT, and the shape "rectangular parallelepiped long in the X-axis direction" and the coordinate position (X30, Y30, Z30) of the processing device KA are acquired in step S22, the CPU 2 serves as the generation unit 13 (shown in FIG. 2) to generate the virtual space KK as shown in FIG. 18.

The virtual space KK includes objects corresponding to all bodies acquired by the scanning in step S21. More specifically, the virtual space KK includes the continuous printing device object RTobj serving as an object corresponding to the continuous printing device RT and the processing device object KAobj serving as an object corresponding to the processing device KA.

[Step S23] When the virtual space KK is generated in step S22, the CPU 2 serves as the detection unit 12 (shown in FIG. 2) to detect whether at least one of the continuous printing device RT and the processing device KA moves in the real space GK, as in step S12 of the first exemplary embodiment. Here, as described above, both the continuous printing device RT and the processing device KA move as indicated by two white arrows in FIGS. 16 and 17. As a result, the CPU 2 detects a fact that the shape "shape long in the X-axis direction" moves, in other words, detects a fact that the continuous printing device RT moves. Similarly, the CPU 2 detects a fact that the shape "rectangular parallelepiped long in the X-axis direction" moves, in other words, detects a fact that the processing device KA moves. By detecting the two facts described above, the processing proceeds to "YES".

[Step S24] When the movement of the continuous printing device RT and the processing device KA in the real space GK is detected in step S23, the CPU 2 serves as the acquisition unit 11 to acquire a coordinate position (x21, y21, z21) of the continuous printing device object RTobj and a coordinate position (x31, y31, z31) of the processing device object KAobj in the virtual space KK as shown in FIG. 19.

[Step S25] When the coordinate position (x21, y21, z21) of the continuous printing device object RTobj and the coordinate position (x31, y31, z31) of the processing device object KAobj in the virtual space KK are acquired in step S24, the CPU 2 serves as the update unit 14 (shown in FIG. 2) to update the coordinate position of the arrow object YJobj based on the coordinate position (x21, y21, z21) of the continuous printing device object RTobj and the coordinate position (x31, y31, z31) of the processing device object KAobj in the virtual space KK as shown in FIG. 19. Thereby, the CPU 2 acquires a start point ST (x21, y21, z21) and an end point EN (x31, y31, z31) of the arrow object YJobj. In other words, the CPU 2 arranges the arrow object YJobj whose start point ST is the coordinate position (x21, y21, z21) and whose end point EN is (x31, y31, z31) in the virtual space KK.

[Step S26] When the coordinate position (x21, y21, z21) of the start point ST and the coordinate position (x31, y31, z31) of the end point EN of the arrow object YJobj in the virtual space KK are acquired in step S25, the CPU 2 serves as the mixing unit 15 (shown in FIG. 2) to generated the mixed space FK shown in FIG. 20 by mixing the continuous printing device RT and the processing device KA in the real space GK (shown in FIG. 17), with the continuous printing device object RTobj, the processing device object KAobj and the arrow object YJobj in the virtual space KK (shown in FIG. 19). In the generated mixed space FK, there is the continuous printing device RT, the processing device KA and the arrow object YJobj, which are visible; and the continuous printing device object RTobj and the processing device object KAobj, which are invisible (the continuous printing device object RTobj and the processing device object KAobj, which are invisible, are not shown in FIG. 20).

In the second exemplary embodiment, the coordinate position of the start point ST and the coordinate position of the end point EN of the arrow object YJobj are specified without acquiring the coordinate positions of the continuous printing device RT and the processing device KA in the real space GK as described above.

Third Exemplary Embodiment

An information processing device according to a third exemplary embodiment will be described.

Configuration of Third Exemplary Embodiment

A configuration of the information processing device JS according to the third exemplary embodiment is the same as that of the information processing device JS according to the first exemplary embodiment shown in FIG. 1.

Figure 21:
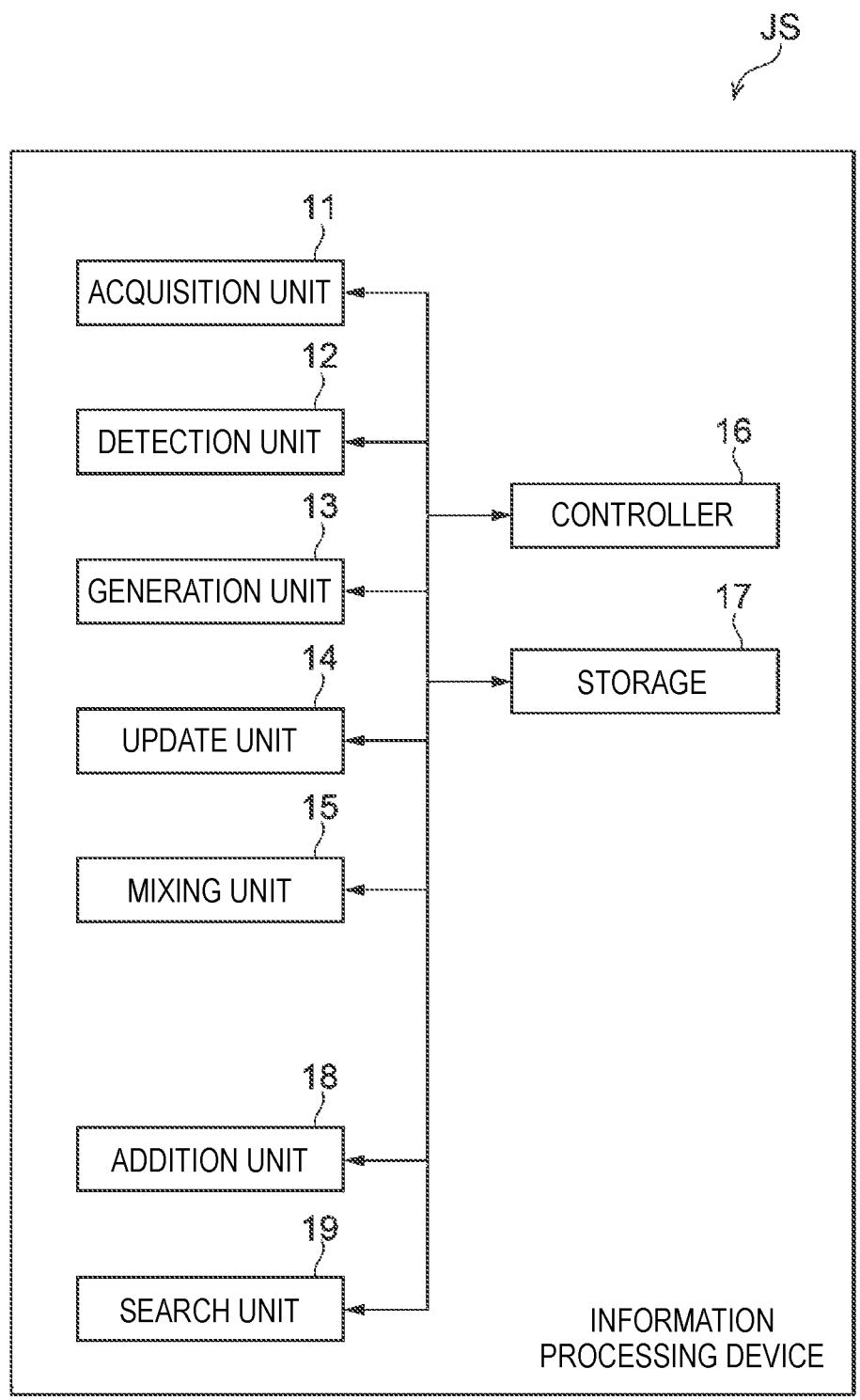
FIG. 21 is a functional block diagram of an information processing device according to a third exemplary embodiment.

FIG. 21 is a functional block diagram of the information processing device JS according to the third exemplary embodiment.

As is apparent from a comparison of FIG. 2 of the first exemplary embodiment and FIG. 21 of the third exemplary embodiment, the information processing device JS according to the present exemplary embodiment, similarly to first exemplary embodiment, includes the acquisition unit 11, the detection unit 12, the generation unit 13, the update unit 14, the mixing unit 15, the control unit 16 and a storage unit 17, and different from the first exemplary embodiment, further includes an addition unit 18 and a search unit 19. Functions of the addition unit 18 and the search unit 19 will be described below.

FIG. 22 shows a table TB stored in the storage medium 4 according to the present exemplary embodiment.

The storage medium 4 (shown in FIG. 1) according to the present exemplary embodiment stores the table TB. As shown in FIG. 22, the table TB shows a correspondence relationship of "print content" (what is printed), which is a content performed by the continuous printing device RT (for example, shown in FIG. 24); "processing work" to be performed by processing devices KA1 to KA3 (for example, shown in FIG. 24) corresponding to the "print content"; and "processing device number" of each of the processing devices KA1 to KA3 to actually perform the "processing work". In the table TB, the processing device numbers "1", "2" and "3" respectively refer to the processing device KA1, the processing device KA2 and the processing device KA3. Here, the "print content" is an example of a "processing step".

Operation of Third Exemplary Embodiment

The information processing device JS according to the present exemplary embodiment is different from the information processing device JS according to the first exemplary embodiment, and displays the "arrow object YJobj" (for example, shown in FIG. 28) as an associated object, similarly to the information processing device JS according to the second exemplary embodiment.

Figure 23:
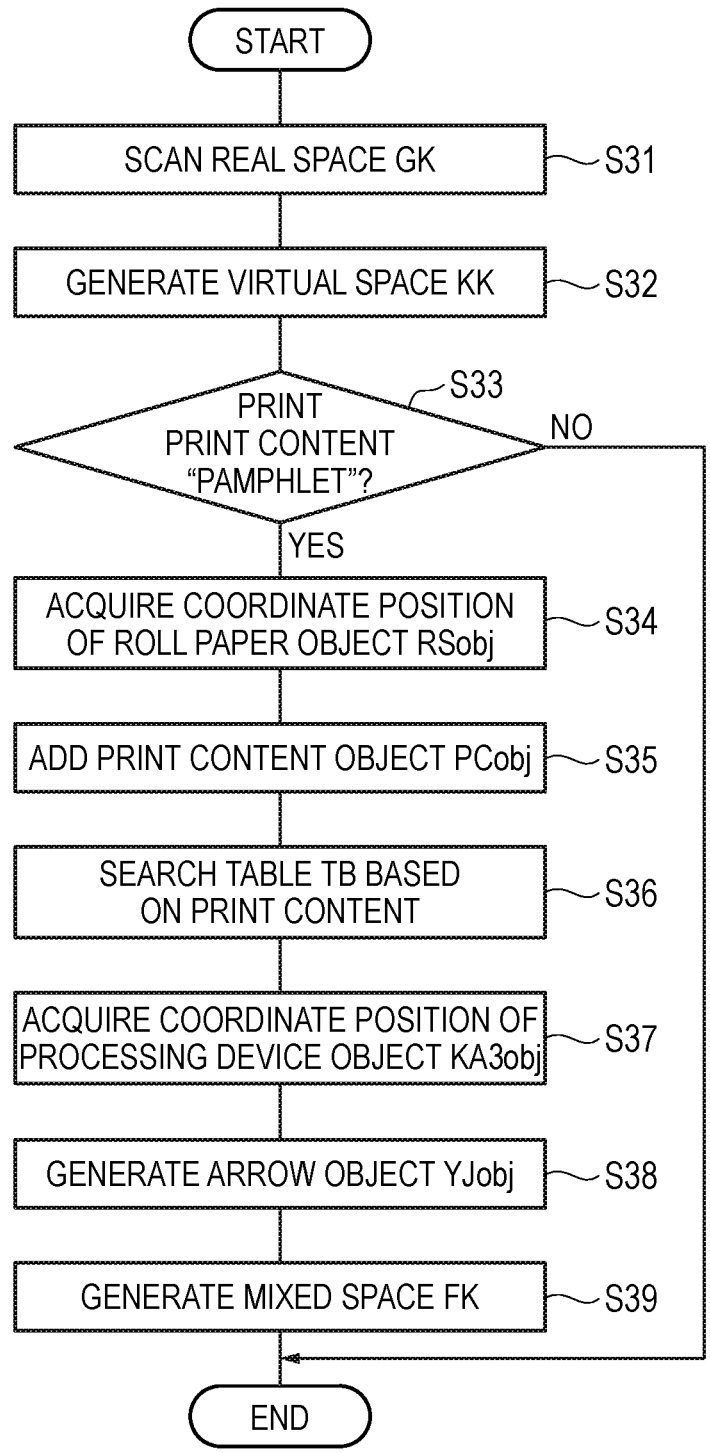
FIG. 23 is a flowchart showing operation of an information processing device according to the third exemplary embodiment.
Figure 24:
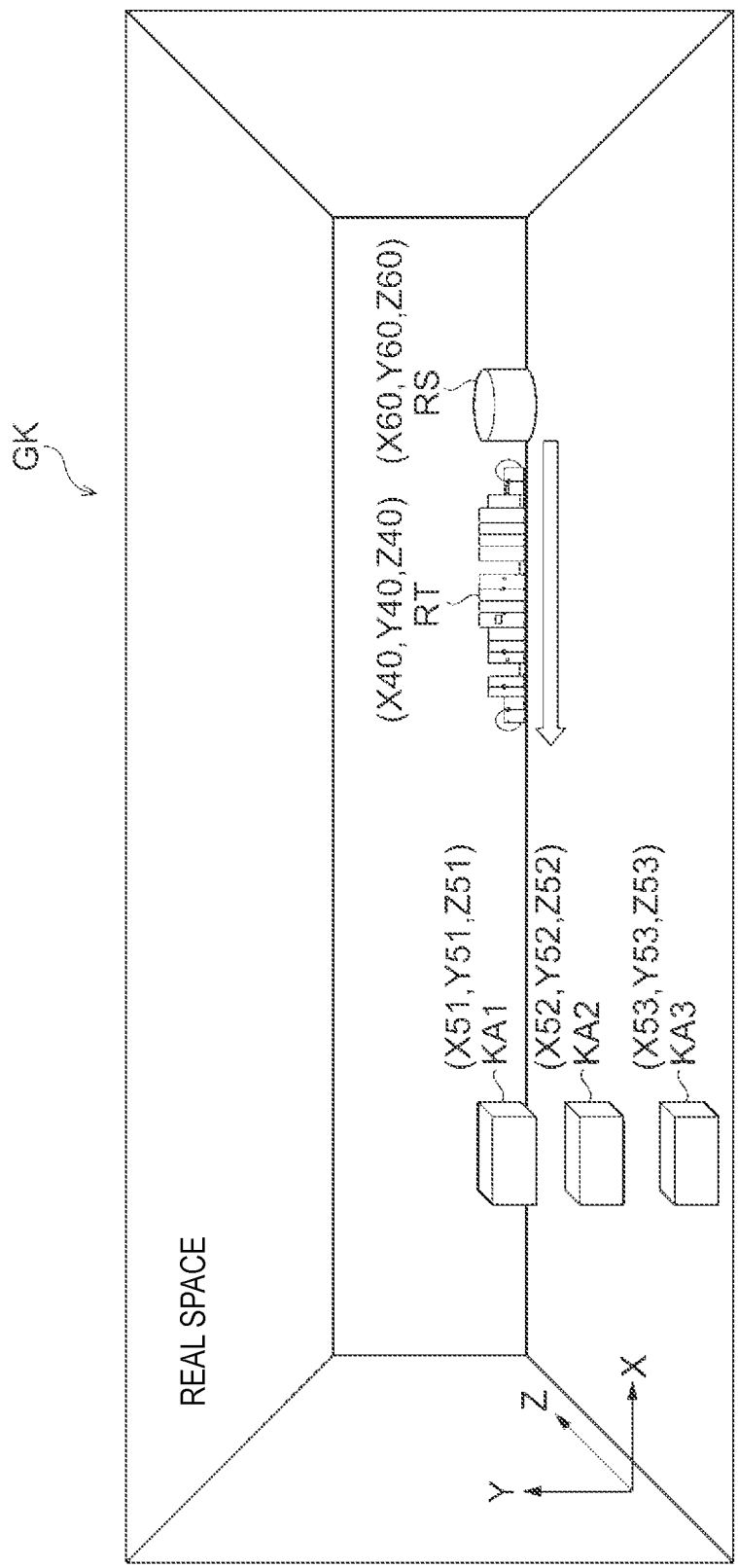
FIG. 24 shows an example of a real space (before processing) according to the third exemplary embodiment.
Figure 25:
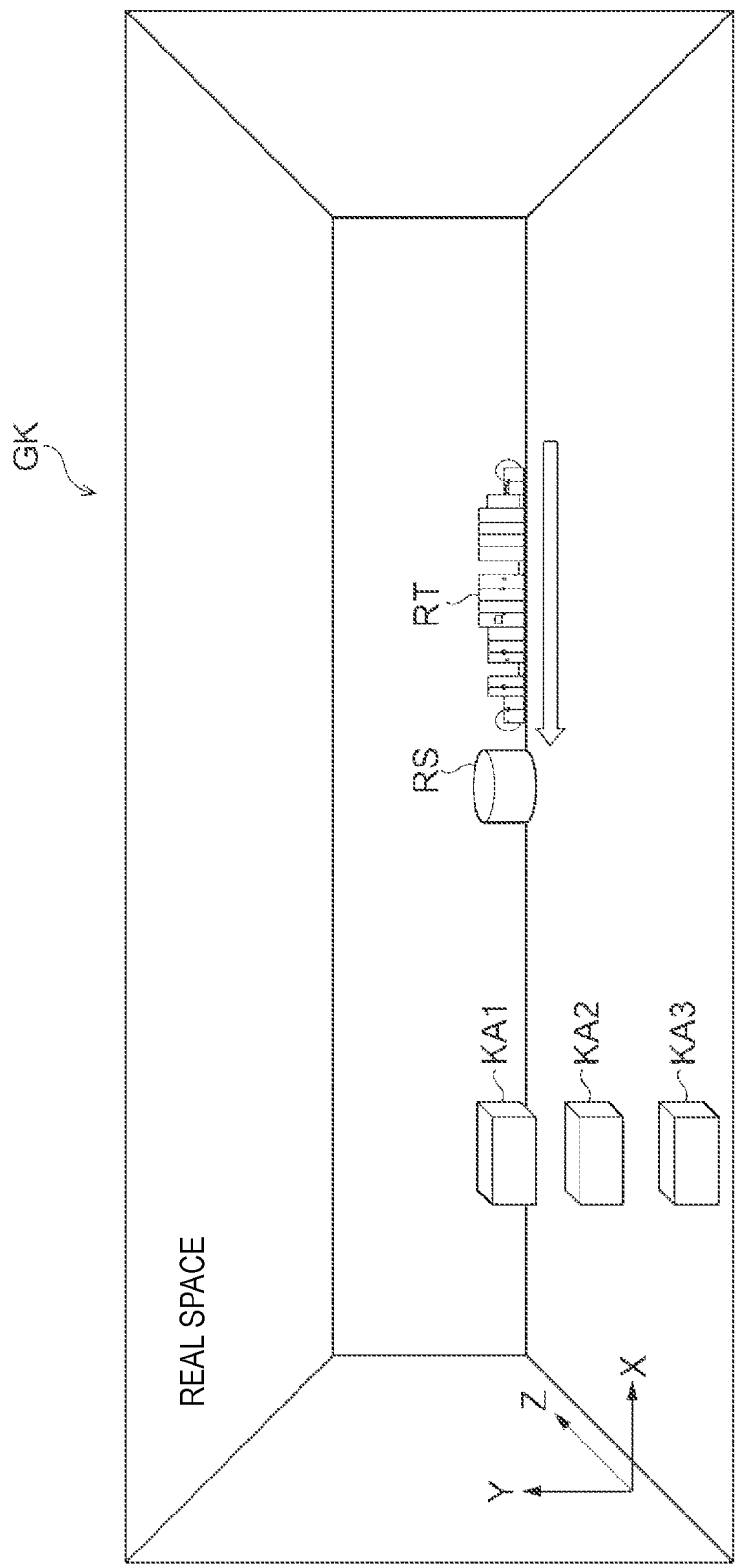
FIG. 25 shows an example of the real space (after processing) according to the third exemplary embodiment.
Figure 26:
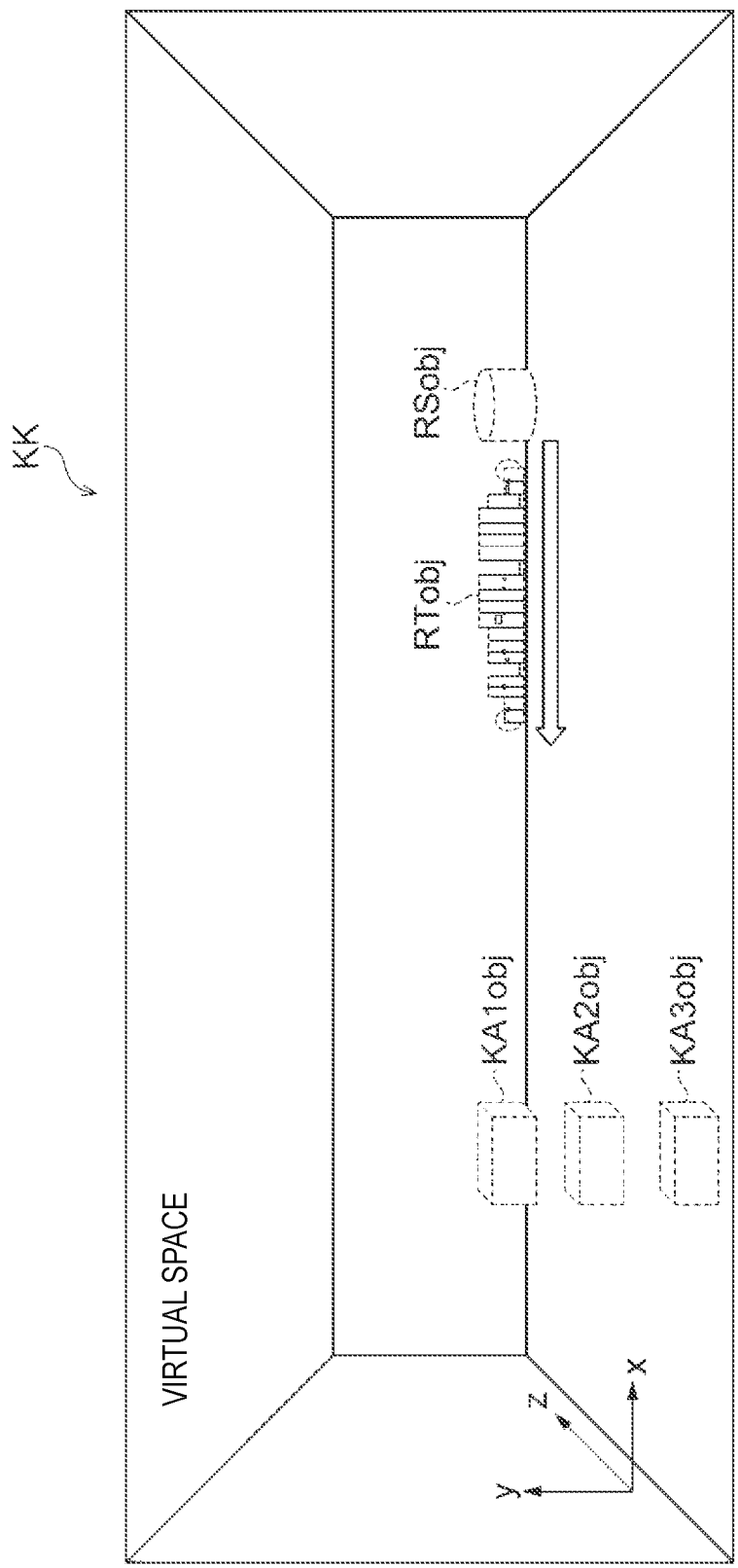
FIG. 26 shows an example of a virtual space (before processing) according to the third exemplary embodiment.
Figure 27:
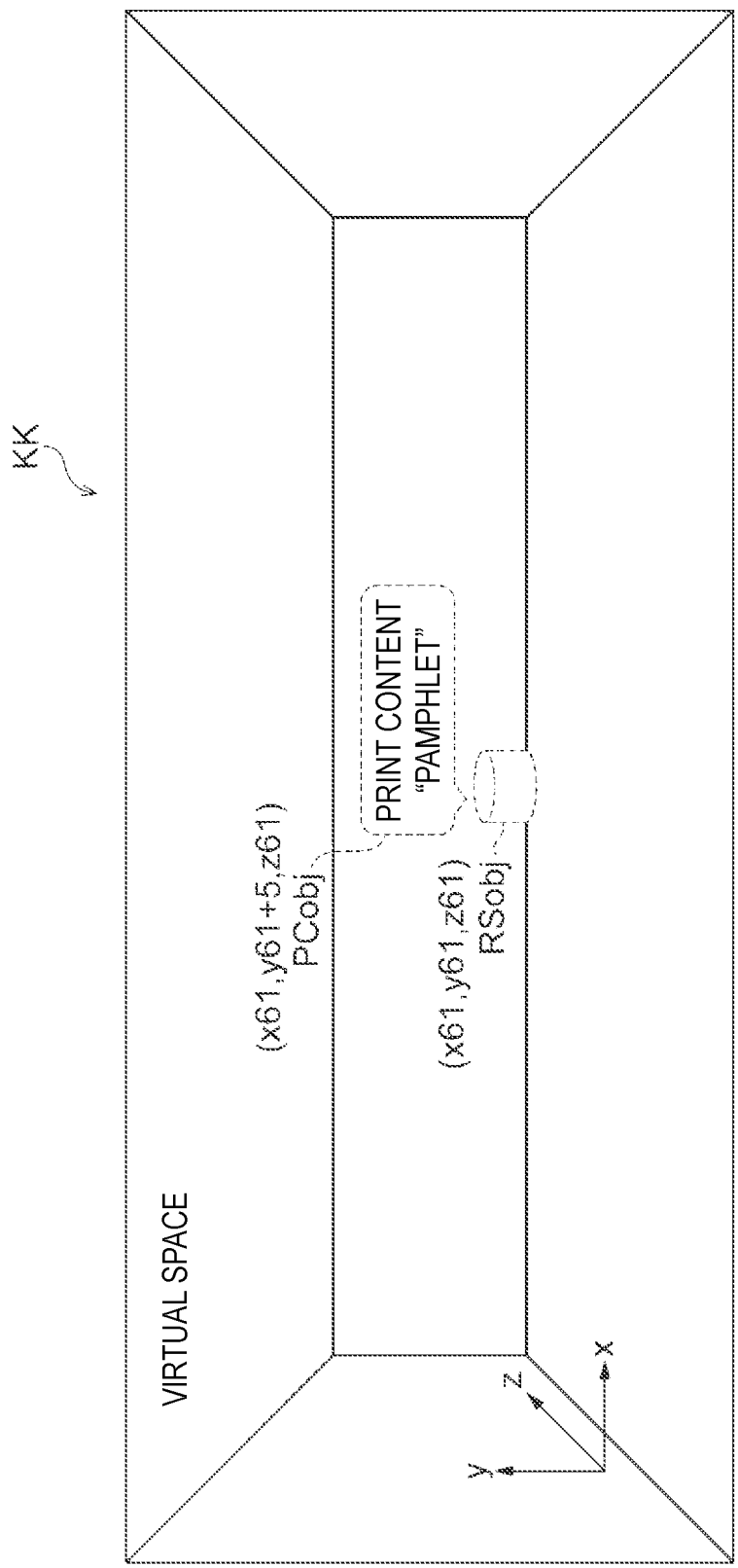
FIG. 27 shows an example of the virtual space (a first half after processing) according to the third exemplary embodiment.
Figure 28:
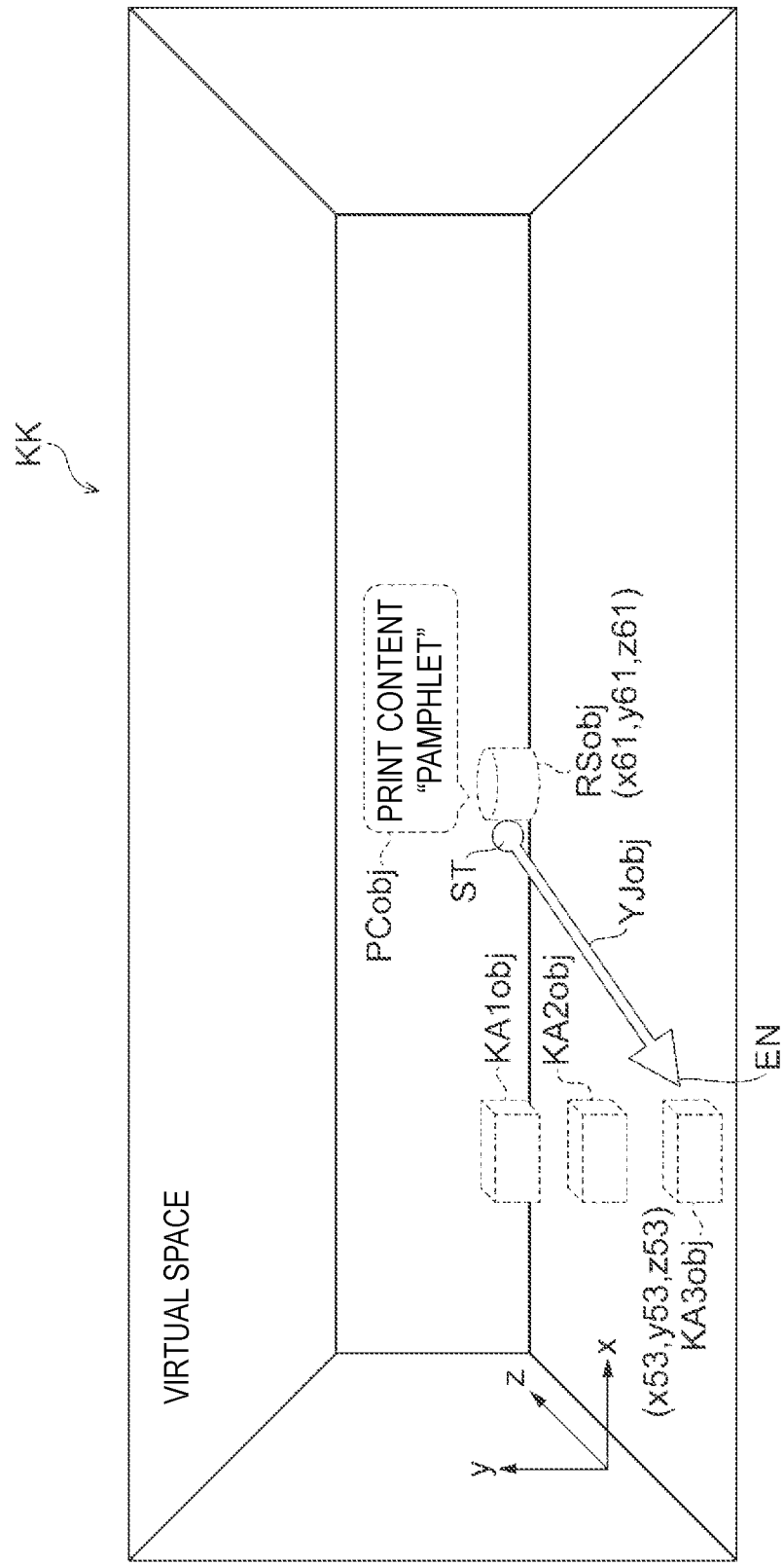
FIG. 28 shows an example of the virtual space (a second half after processing) according to the third exemplary embodiment.
Figure 29:
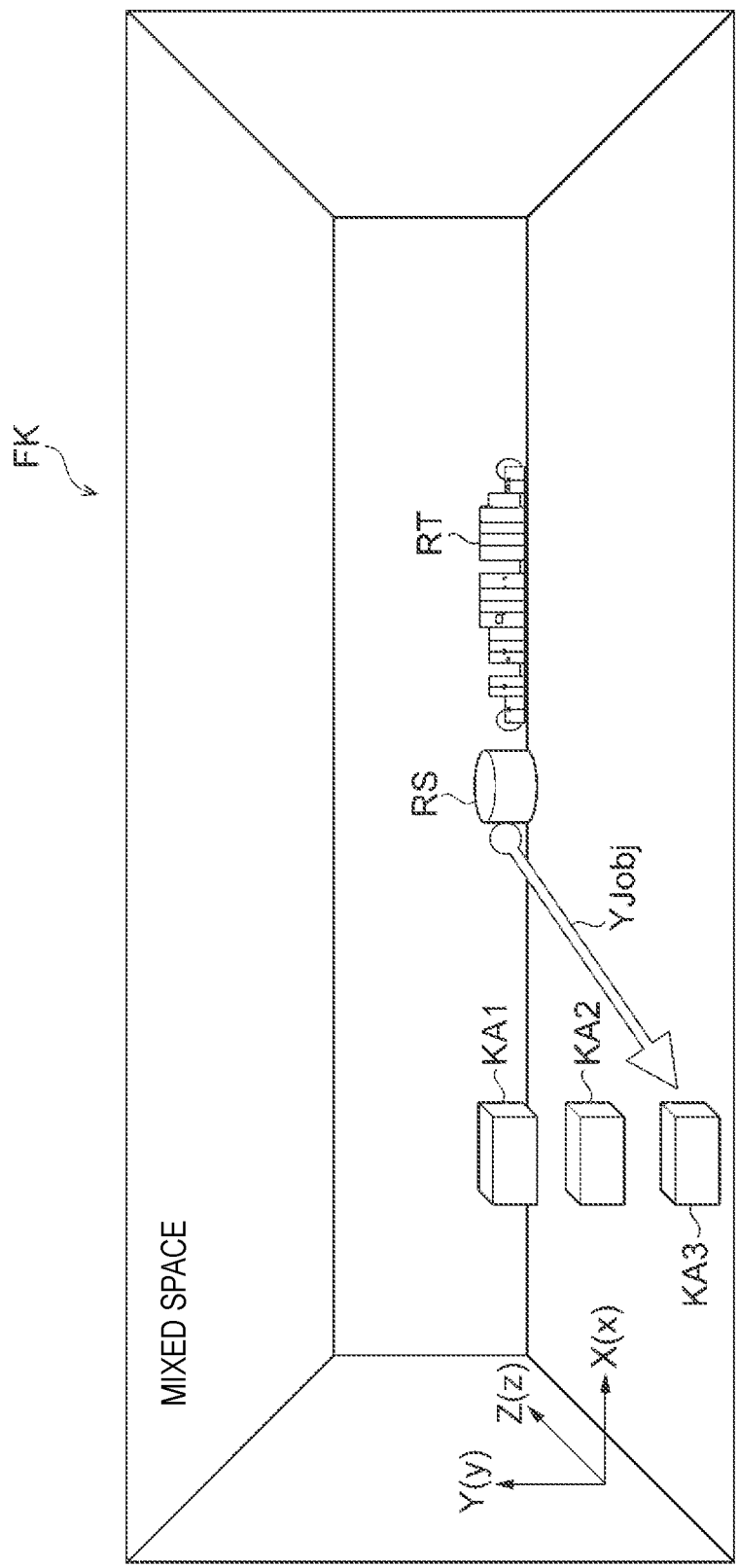
FIG. 29 shows an example of a mixed space (after processing) according to the third exemplary embodiment.

FIG. 23 is a flowchart showing operation of the information processing device JS according to the present exemplary embodiment. FIG. 24 shows an example of a real space (before processing) according to the present exemplary embodiment. FIG. 25 shows an example of the real space (after processing) according to the present exemplary embodiment. FIG. 26 shows an example of a virtual space (before processing) according to the present exemplary embodiment. FIG. 27 shows an example of the virtual space (a first half after processing) according to the present exemplary embodiment. FIG. 28 shows an example of the virtual space (a second half after processing) according to the present exemplary embodiment. FIG. 29 shows an example of a mixed space (after processing) according to the present exemplary embodiment.

Hereinafter, the operation of the information processing device JS according to the present exemplary embodiment will be described with reference to the flowchart shown in FIG. 23, and FIGS. 24 to 29.

For easy description and understanding, it is assumed that in the real space GK, the continuous printing device RT prints the print content "pamphlet" on a roll paper RS which is a coated paper in paper quality such as a coated paper, a matte coated paper, a high-quality paper and a special paper.

Here, the roll paper RS is an example of a "target". The roll paper object RSobj described below is an example of a "target object". The processing steps for paper quality such as the coated paper, the matte coated paper, the high-quality paper and the special paper, and the print content such as "pamphlet" and "book" (shown in FIG. 20) are examples of "attribute information".

[Step S31] The information processing device JS, the CPU 2 (shown in FIG. 1) serves as the acquisition unit 11 (shown in FIG. 21) to scan the real space GK shown in FIG. 24, similarly to step S11 of the first exemplary embodiment. More specifically, the CPU 2 acquires shapes and coordinate positions of the continuous printing device RT, plural processing devices KA1 to KA3, and the roll paper in the real space GK along a Z-axis direction in the real space GK as shown in FIG. 24.

Here, the CPU 2 acquires a shape "shape long in an X-axis direction" and a coordinate position (X40, Y40, Z40) of the continuous printing device RT. The CPU 2 also acquires a shape "rectangular parallelepiped" and a coordinate position (X51, Y51, Z51), a shape "rectangular parallelepiped" and a coordinate position (X52, Y52, Z52), and a shape "rectangular parallelepiped" and a coordinate position (X53, Y53, Z53) of the plural processing devices KA1 to KA3, respectively. The CPU 2 further acquires a shape "cylinder" and a coordinate position (X60, Y60, Z60) of the roll paper RS.

[Step S32] When the shapes and the coordinate positions of the continuous printing device RT, the plura processing devices KA1 to KA3 and the roll paper RS in the real space GK are acquired in step S31, the CPU 2 serves as the generation unit 13 (shown in FIG. 21) to generate the virtual space KK as shown in FIG. 26.

The virtual space KK includes objects corresponding to all bodies acquired by the scanning in step S31. More specifically, the virtual space KK includes the continuous printing device object RTobj serving as an object corresponding to the continuous printing device RT, plural processing device objects KA1obj to KA3obj serving as objects corresponding to the plural processing devices KA1 to KA3, and the roll paper object RSobj serving as an object corresponding to the roll paper RS.

[Step S33] When the virtual space KK is generated in step S32, the CPU 2 serves as the detection unit 12 (shown in FIG. 21) to detect whether the continuous printing device RT prints any print content (shown in FIG. 22) on the roll paper RS. As described above, as indicated by white arrows in FIGS. 24 and 25, the roll paper RS is supplied to the continuous printing device RT, and the continuous printing device RT prints the print content "pamphlet" on the roll paper RS, and thus the process proceeding to "YES".

[Step S34] When it is detected in step S33 that the continuous printing device RT prints the print content "pamphlet" on the roll paper RS, the CPU 2 serves as the acquisition unit 11 (shown in FIG. 21) to acquire a coordinate position (x61, y61, z61) of the roll paper object RSobj. Since the roll paper object RSobj is used by the information processing device JS to calculate a coordinate position of the arrow object YJobj (shown in FIGS. 28 and 29), the roll paper object RSobj is not required to be visible for a user of the information processing device JS, and is invisible.

[Step S35] When the coordinate position (x61, y61, z61) of the roll paper object RSobj is acquired in step S34, the CPU 2 serves as the addition unit 18 (shown in FIG. 21) to add a print content object PCobj, which is a virtual object of the print content "pamphlet" (shown in FIG. 22), to vicinity of the roll paper object RSobj, for example, a coordinate position (61x, y61+5, z61).

Here, the print content object PCobj is used by the information processing device JS to obtain a processing step to be performed by any of the processing devices KA1 to KA3 following a processing step of printing the print content "pamphlet" performed by the continuous printing device RT, the print content object PCobj is not required to be visible for the user of the information processing device JS, and is invisible.

[Step S36] When the print content object PCobj is added to the coordinate position (61x, y61+5, z61) in the vicinity of the roll paper object RSobj in the virtual space KK in step S35, the CPU 2 serves as the search unit 19 (shown in FIG. 21) to refer to the table TB (shown in FIG. 22). With this reference, the CPU 2 searches the real space GK for the processing work and the processing device number corresponding to the print content "pamphlet" printed on the roll paper RS by the continuous printing device RT. Thereby, the CPU 2 acquires the processing work "saddle stitching" and the processing device number "3".

[Step S37] When the processing work "saddle stitching" and the processing device number "3" are acquired in step S36, the CPU 2 serves as the acquisition unit 11 (shown in FIG. 21) to acquire a coordinate position (x53, y53, z53) of the processing device object KA3obj corresponding to the processing device KA3 having the processing device number "3" as shown in FIG. 28.

Since the processing device object KA3obj is used by the information processing device JS to calculate a coordinate position of the arrow object YJobj, the processing device object KA3obj is not required to be visible for the user of the information processing device JS, and is invisible.

[Step S38] When the coordinate position (x53, y53, z53) of the processing device object KA3obj in the virtual space KK is acquired in step S37, the CPU 2 serves as generation unit 13 (shown in FIG. 21) to generate the arrow object YJobj in the virtual space KK. More specifically, the CPU 2 specifies the coordinate position of the arrow object YJobj based on the coordinate position (x61, y61, z61) of the roll paper object RSobj and the coordinate position (x53, y53, z53) of the processing device object KA3obj in the virtual space KK as shown in FIG. 28. Thereby, the CPU 2 specifies the coordinate position (x61, y61, z61) of the start point ST and the coordinate position (x53, y53, z53) of the end point EN of the arrow object YJobj.

In other words, the CPU 2 specifies a relationship between the continuous printing device object RTobj as a body object and the arrow object YJobj as an associated object based at least on the coordinate position of the roll paper object RSobj, which is specified by the continuous printing device RT as a body and the print content "pamphlet" as the processing step performed by the continuous printing device RT, more specifically, which is defined by the continuous printing device RT as the object and the print content "pamphlet" as the processing step performed by the continuous printing device RT.

[Step S39] When the coordinate position (x61, y61, z61) of the start point ST and the coordinate position (x53, y53, z53) of the end point EN of the arrow object YJobj are acquired in step S38, the CPU 2 serves as the mixing unit 15 (shown in FIG. 21) to generate the mixed space FK shown in FIG. 29 by mixing the continuous printing device RT, the plural processing devices KA1 to KA3 and the roll paper RS in the real space GK (shown in FIG. 25), with the roll paper object RSobj, the print content object PCobj, the processing device objects KA1obj to KA3obj and the arrow object YJobj in virtual space KK (shown in FIG. 28). In the generated mixed space FK, there is the continuous printing device RT, the roll paper RS, the processing devices KA1 to KA3 and the arrow object YJobj, which are visible; and the processing device objects KA1obj to KA3obj, the roll paper object RSobj and the print content object PCobj, which are invisible (the print content object PCobj, the roll paper object RSobj and the processing device objects KA1obj to KA3obj, which are invisible, are not shown in FIG. 29).

In the third exemplary embodiment, the relationship of the arrow object YJobj with the continuous printing device object RTobj in the virtual space KK is specified without being affected by other situations in the virtual space KK as described above.

That is, attribute information of the roll paper object RSobj and a position of a possible processing device object KA3obj are reflected in a direction indicated by the arrow object YJobj. A position of the roll paper object RSobj is also reflected in a direction indicated by the arrow object YJobj.

Fourth Exemplary Embodiment

An information processing device according to a fourth exemplary embodiment will be described.

Configuration of Fourth Exemplary Embodiment

A configuration of the information processing device JS according to the fourth exemplary embodiment is the same as that of the information processing device JS according to the first exemplary embodiment (shown in FIG. 1).

Functional blocks of the information processing device JS according to the fourth exemplary embodiment are the same as functional blocks of the information processing device JS according to the third exemplary embodiment (shown in FIG. 21).

On the other hand, different from the information processing device JS according to the third exemplary embodiment, the information processing device JS according to the fourth exemplary embodiment does not include the table TB (shown in FIG. 22) since a user of the information processing device JS performs selection of any one of the processing devices KA1 to KA3 instead of the information processing device JS.

Operation of Fourth Exemplary Embodiment

The information processing device JS according to the fourth exemplary embodiment displays the arrow object YJobj similarly to the information processing device JS according to the third exemplary embodiment.

On the other hand, different from the information processing device JS according to the third exemplary embodiment, the information processing device JS according to the present exemplary embodiment adds the print content object PCobj that is visible for convenience of the above-described selection by the user of the information processing device JS instead of the print content object PCobj that is invisible.

Figure 30:
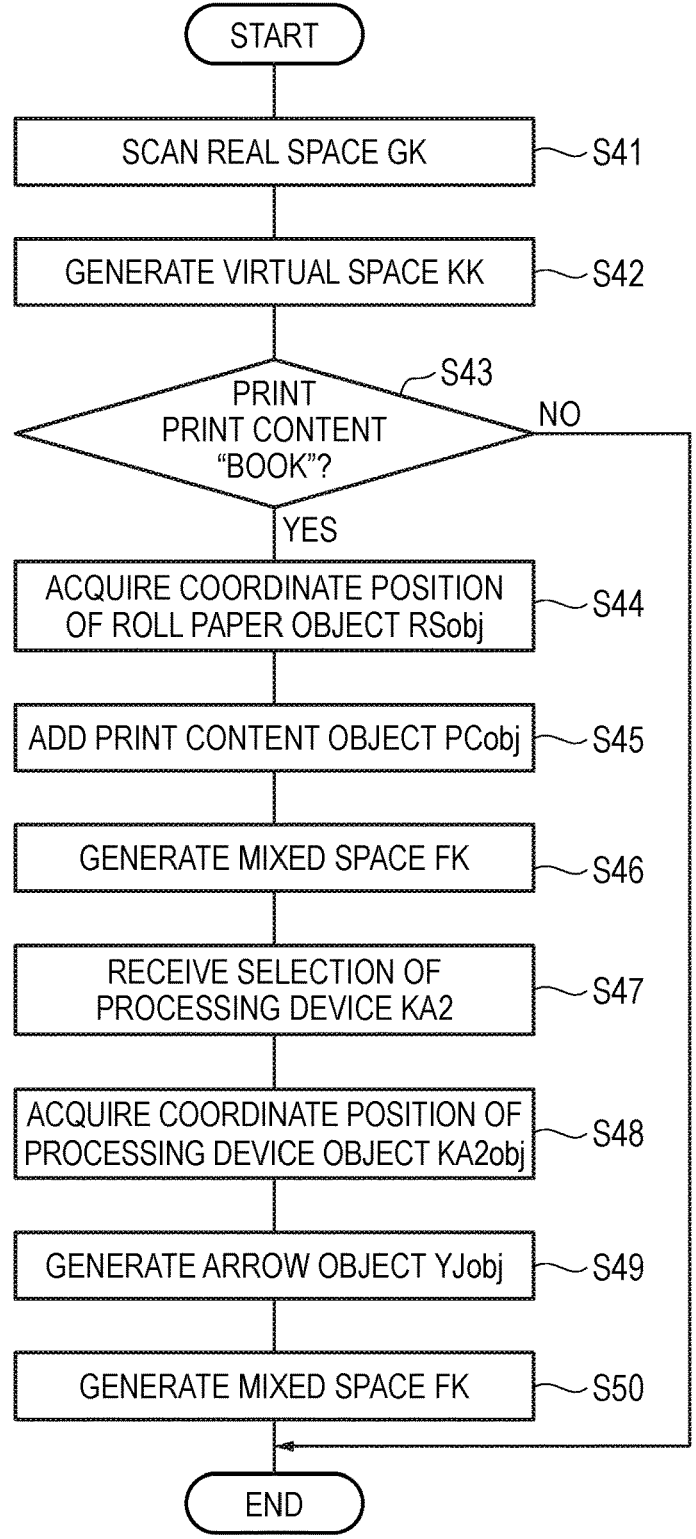
FIG. 30 is a flowchart showing operation of an information processing device according to a fourth exemplary embodiment.
Figure 31:
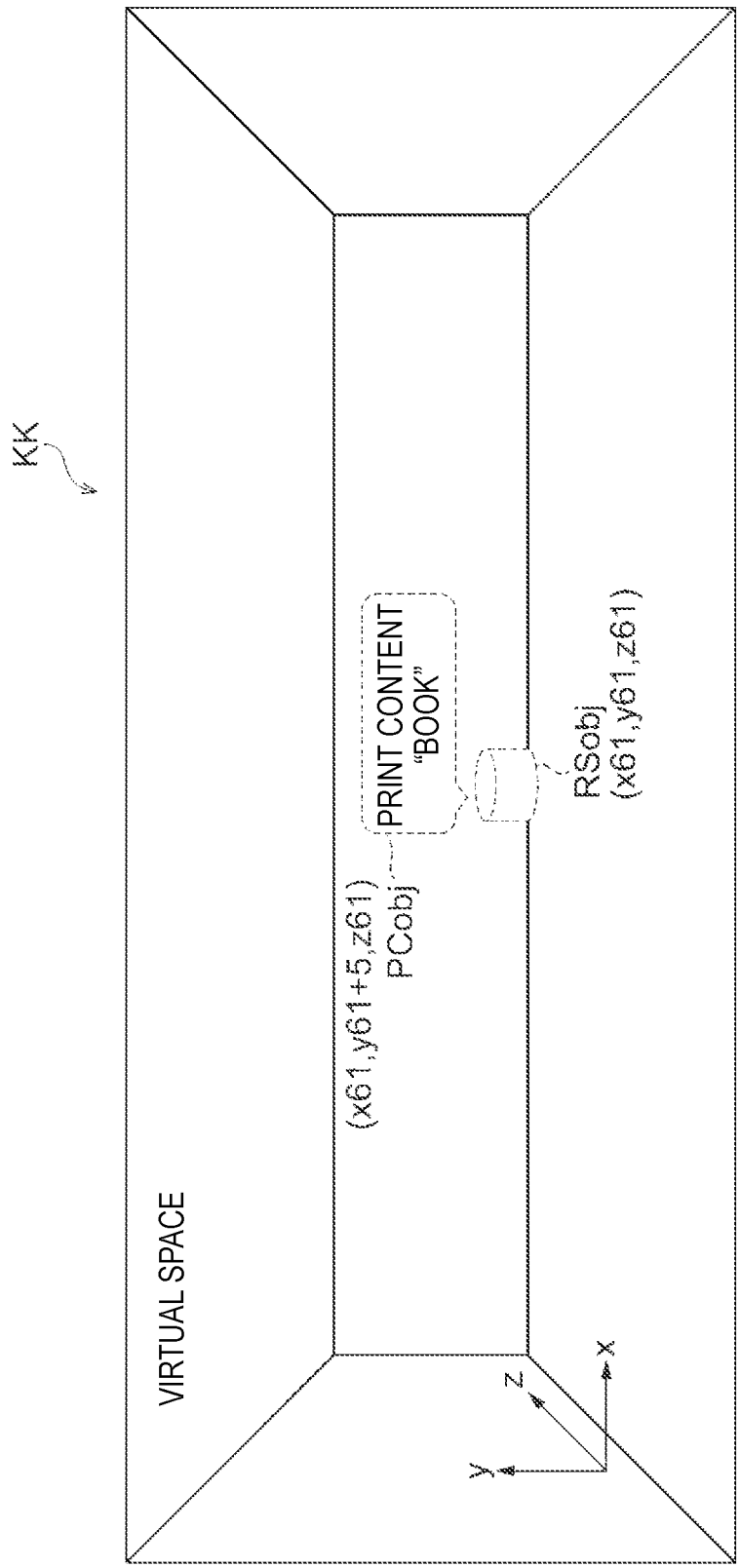
FIG. 31 shows an example of a virtual space (after processing) according to the fourth exemplary embodiment.
Figure 32:
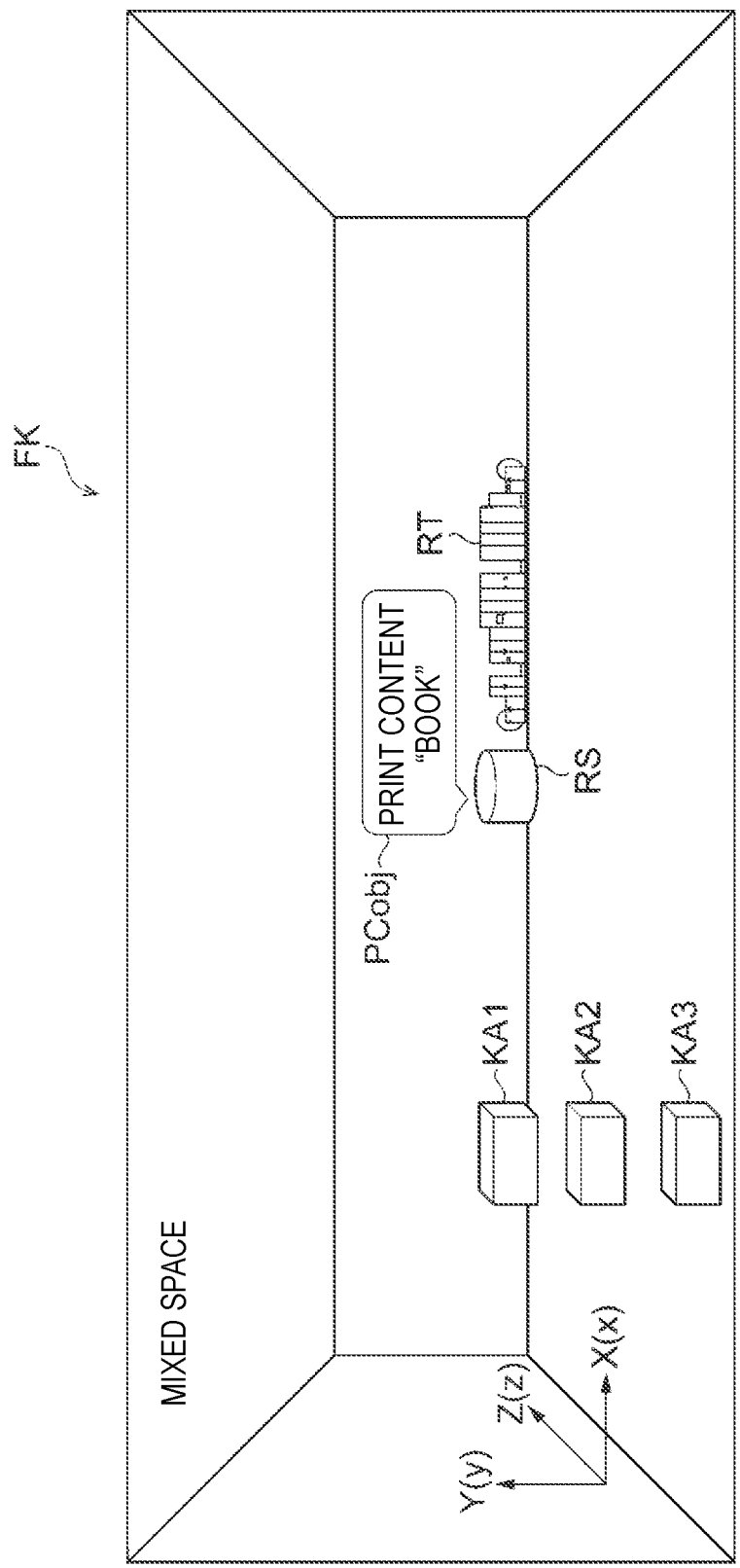
FIG. 32 shows an example of a mixed space (a first half after processing) according to the fourth exemplary embodiment.
Figure 33:
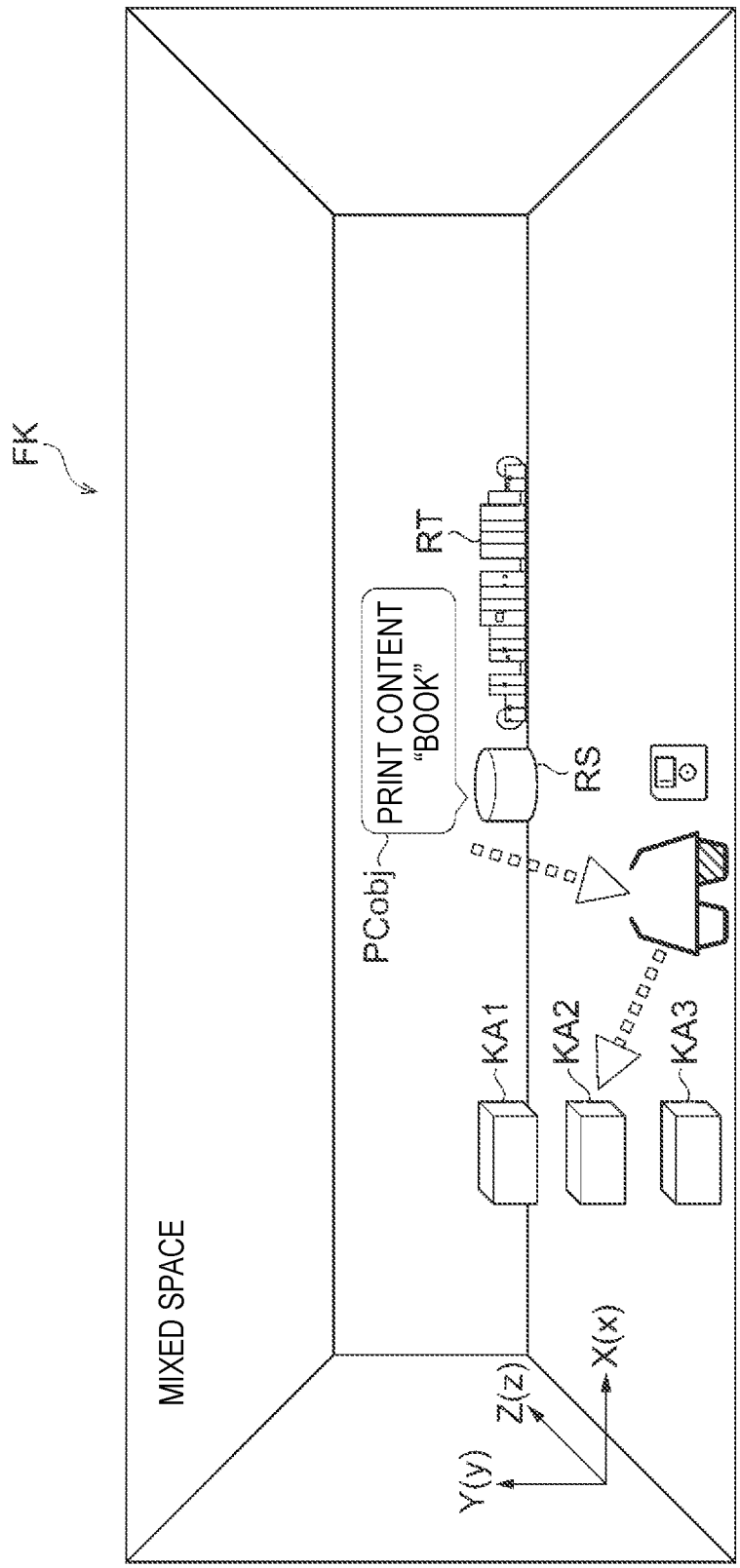
FIG. 33 shows an example of the mixed space (a second half after processing) according to the fourth exemplary embodiment.
Figure 34:
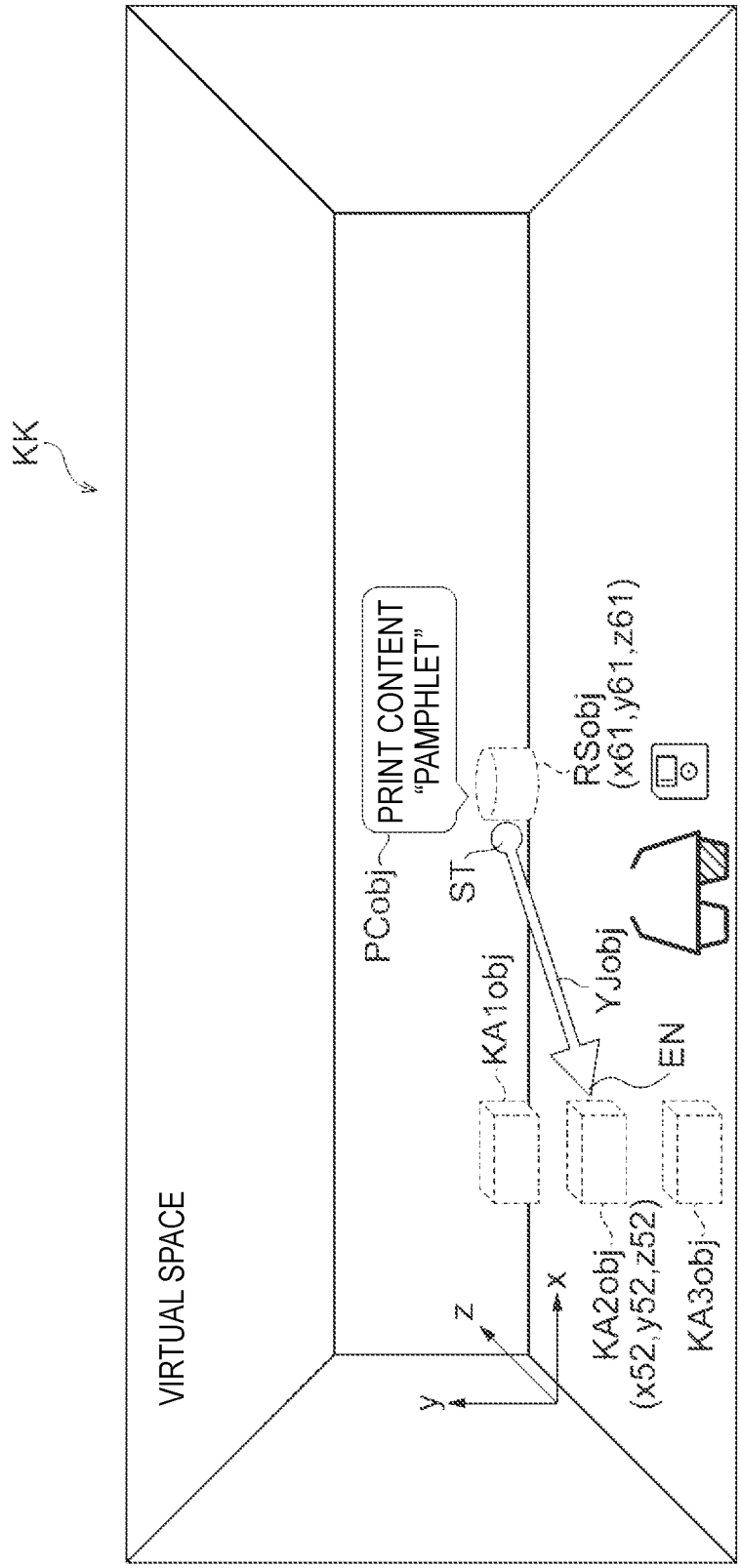
FIG. 34 shows an example of the virtual space (after selection) according to the fourth exemplary embodiment.
Figure 35:
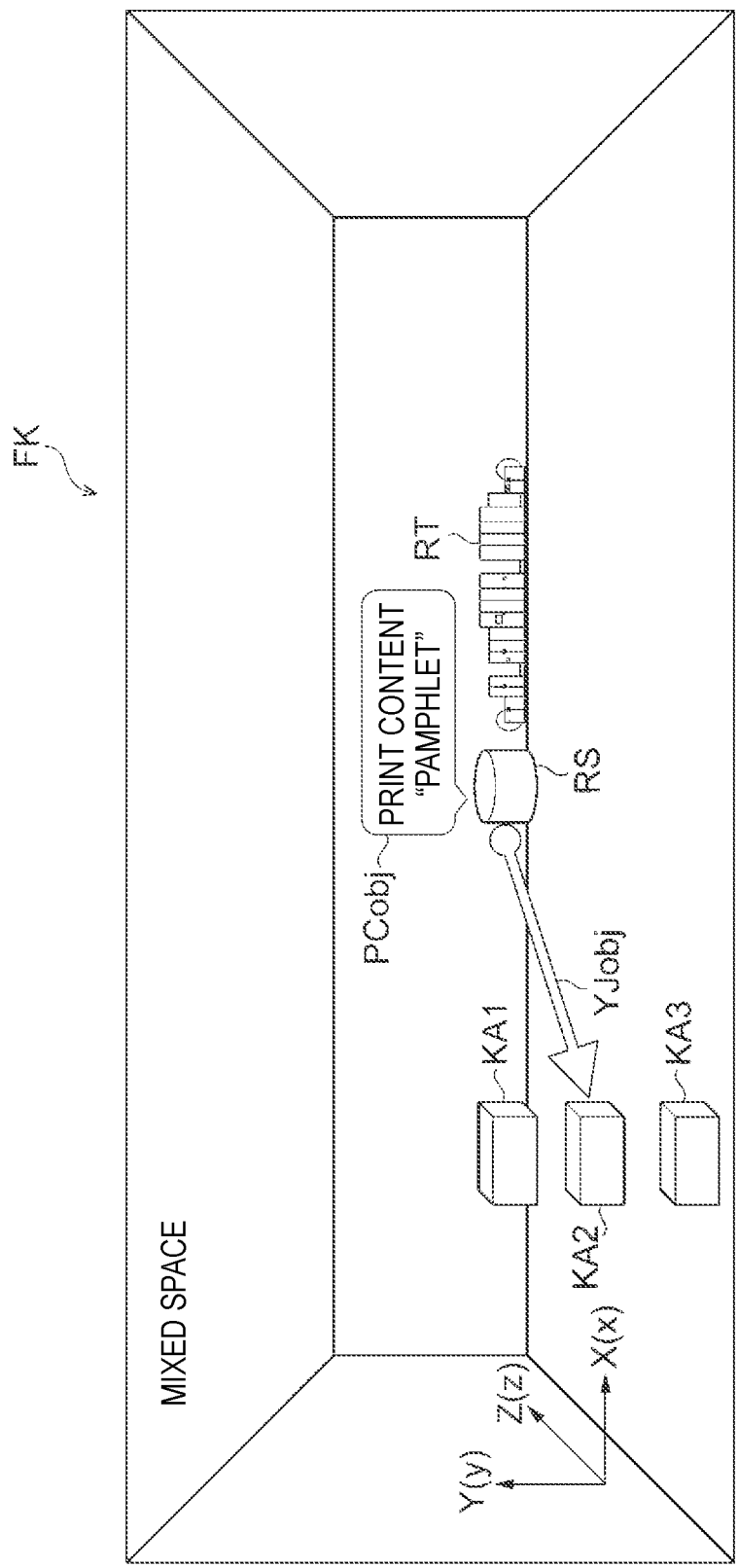
FIG. 35 shows an example of the mixed space (after selection) according to the fourth exemplary embodiment.

FIG. 30 is a flowchart showing operation of the information processing device JS according to the present exemplary embodiment. FIG. 31 shows an example of a virtual space (after processing) according to the present exemplary embodiment. FIG. 32 shows an example of a mixed space (a first half after processing) according to the present exemplary embodiment. FIG. 33 shows an example of the mixed space (a second half after processing) according to the present exemplary embodiment. FIG. 34 shows an example of the virtual space (after selection) according to the present exemplary embodiment. FIG. 35 shows an example of the mixed space (after selection) according to the present exemplary embodiment.

Hereinafter, the operation of the information processing device JS according to the present exemplary embodiment will be described with reference to the flowchart shown in FIG. 30, FIGS. 24, 25, and 26 illustrating the third exemplary embodiment, and FIGS. 31 to 35 illustrating the present exemplary embodiment.

For easy description and understanding, it is assumed that in the real space GK, different from the third exemplary embodiment, the continuous printing device RT prints a print content "book" instead of the print content "pamphlet"

on the roll paper RS which is a coated paper in paper quality such as a coated paper, a matte coated paper, a high-quality paper and a special paper.

[Step S41] In the information processing device JS, the CPU 2 (shown in FIG. 1) serves as the acquisition unit 11 (shown in FIG. 21) to scan the real space GK shown in FIG. 24 similarly to step S31 of the third exemplary embodiment. By this scanning, the CPU 2 acquires a shape "shape long in an X-axis direction" and the coordinate position (X40, Y40, Z40) of the continuous printing device RT as shown in FIG. 24.

The CPU 2 also acquires a shape "rectangular parallelepiped" and the coordinate position (X51, Y51, Z51), a shape "rectangular parallelepiped" and the coordinate position (X52, Y52, Z52), and a shape "rectangular parallelepiped" and the coordinate position (X53, Y53, Z53) of the plural processing devices KA1 to KA3, respectively.

The CPU 2 further acquires a shape "cylinder" and the coordinate position (X60, Y60, Z60) of the roll paper RS.

[Step S42] When shapes and coordinate positions of the continuous printing device RT, the plural processing devices KA1 to KA3, and the roll paper RS in the real space GK are acquired in step S41, the CPU 2 serves as the generation unit 13 (shown in FIG. 21) to generate the virtual space KK as shown in FIG. 26 similarly to step S32 of the third exemplary embodiment.

[Step S43] When the virtual space KK is generated in step S42, the CPU 2 serves as the detection unit 12 (shown in FIG. 21) to detect whether the continuous printing device RT prints any print content (shown in FIG. 22) on the roll paper RS. As described above, as indicated by the white arrows in FIGS. 24 and 25, the roll paper RS is supplied to the continuous printing device RT, and the continuous printing device RT prints the print content "book" on the roll paper RS, and thus the processing proceeds to "YES".

[Step S44] When it is detected in step S43 that the continuous printing device RT prints the print content "book" on the roll paper RS, the CPU 2 serves as the acquisition unit 11 (shown in FIG. 21) to acquire the coordinate position (x61, y61, z61) of the roll paper object RSobj. Similarly in the third exemplary embodiment, since the roll paper object RSobj is used by the information processing device JS to calculate a coordinate position of the arrow object YJobj (shown in FIG. 34), the roll paper object RSobj is not required to be visible for the user of the information processing device JS, and is invisible.

[Step S45] When the coordinate position (x61, y61, z61) of the roll paper object RSobj is acquired in step S44, the CPU 2 serves as the addition unit 18 (shown in FIG. 21) to add the print content object PCobj, which is a virtual object of the print content "book" (shown in FIG. 22), to vicinity of the roll paper object RSobj, for example, the coordinate position (61x, y61+5, z61).

Here, since the print content object PCobj is used by the user of the information processing device JS to perform selection following a processing step of printing the print content "book" performed by the continuous printing device RT, instead of being used by the information processing device JS according to the third exemplary embodiment to specify the processing step to be performed by any of the processing devices KA1 to KA3, which is different from the third exemplary embodiment, the print content object PCobj is desired to be visible for the user of the information processing device JS.

[Step S46] When the visible print content object PCobj is added to the coordinate position (61x, y61+5, z61) in the vicinity of the roll paper object RSobj in the virtual space KK in step S45, the CPU 2 serves as the mixing unit 15 (shown in FIG. 21) to generate the mixed space FK shown in FIG. 32 by mixing the a continuous printing device RT, the plural processing devices KA1 to KA3 and the roll paper RS in the real space GK (shown in FIG. 25), with the roll paper object RSobj and the print content object PCobj in the mixed space FK (shown in FIG. 31).

In the generated mixed space FK, there is the continuous printing device RT, the roll paper RS, the processing devices KA1 to KA3 and the print content object PCobj, which are visible; and the roll paper object RSobj, which is invisible (the roll paper object RSobj, which is invisible, is not shown in FIG. 32).

[Step S47] When the mixed space FK is generated in step S46, the user of the information processing device JS visually recognizes the print content object PCobj of the print content "book", and then selects whether it is appropriate to use any of the processing devices KA1 to KA3 to perform a subsequent step that should follow printing by the continuous printing device RT. The CPU 2 serves as the acquisition unit 11 to receive the selection by the user. Here, it is assumed that the user selects processing work "perfect binding" desired to be performed on the roll paper RS where the print content "book" is printed, or the "processing device KA2" to perform the processing work "perfect binding".

Here, two dotted arrows, an MR device simulating eyeglasses and a magnetic disk are not present in the mixed space FK in FIG. 33, which schematically shows that the print content "book" is transmitted from the print content object PCobj to the user (an icon of the eyeglasses), and that the user selects the processing device KA2.

[Step S48] When the selection of the processing work "perfect binding" or the processing device KA2 is received in step S47, the CPU 2 serves as the acquisition unit 11 to acquire a coordinate position (x52, y52, z52) of the processing device object KA2obj in the virtual space KK corresponding to the selected processing device KA2.

[Step S49] When the coordinate position (x52, y52, z52) of the processing device object KA2obj in the virtual space KK is acquired in step S48, the CPU 2 serves as the generation unit 13 to generate the arrow object YJobj in the virtual space KK.

More specifically, the CPU 2 updates, that is, acquires the coordinate position of the arrow object YJobj based on the coordinate position (x61, y61, z61) of the roll paper object RSobj, and the coordinate position (x52, y52, z52) of the processing device object KA2obj in the virtual space KK as shown in FIG. 34. Thereby, the CPU 2 specifies the coordinate position (x61, y61, z61) of the start point ST and the coordinate position (x52, y52, z52) of the end point EN of the arrow object YJobj.

[Step S50] When the coordinate position (x61, y61, z61) of the start point ST and the coordinate position (x52, y52, z52) of the end point EN of the arrow object YJobj are acquired in step S49, the CPU 2 serves as the mixing unit 15 to generated the mixed space FK shown in FIG. 35 by mixing the continuous printing device RT, the plural processing devices KA1 to KA3 and the roll paper RS in the real space GK (shown in FIG. 25), with the roll paper object RSobj, the print content object PCobj, the processing device objects KA1obj to KA3obj and the arrow object YJobj in the virtual space KK (shown in FIG. 34).

In the generated mixed space FK, there is the continuous printing device RT, the roll paper RS, the processing devices KA1 to KA3, the print content object PCobj and the arrow object YJobj, which are visible; and the roll paper object RSobj and the processing device objects KA1obj to KA3obj, which are invisible (the roll paper object RSobj and the processing device objects KA1obj to KA3obj, which are invisible, are not shown in FIG. 35).

In the fourth exemplary embodiment, the coordinate position of the processing device object KA2obj specified by the user is reflected in a direction indicated by the arrow object YJobj instead of the coordinate position of the processing device object KA3obj specified by the information processing device JS in the third exemplary embodiment as described above.

Fifth Exemplary Embodiment

An information processing device according to a fifth exemplary embodiment will be described.

Configuration of Fifth Exemplary Embodiment

A configuration and function blocks of the information processing device JS according to the fifth exemplary embodiment are the same as those of the information processing device JS according to the first exemplary embodiment (shown in FIGS. 1 and 2).

Figure 37:
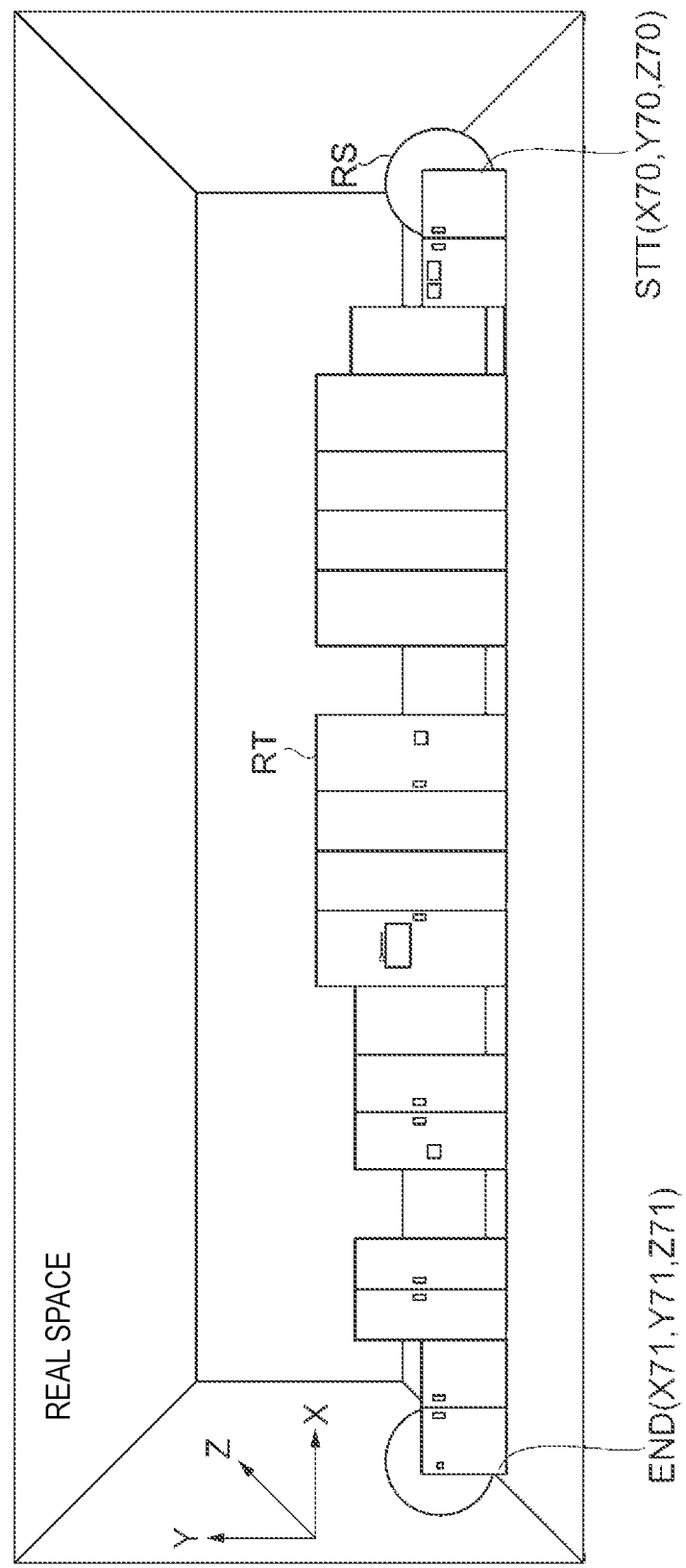
FIG. 37 shows an example of a real space according to the fifth exemplary embodiment.

On the other hand, different from the information processing device JS according to the first exemplary embodiment, in the information processing device JS according to the fifth exemplary embodiment, the continuous printing device object RTobj (for example, shown in FIG. 38) includes information on "a movement path of the roll paper RS" when the continuous printing device RT (for example, shown in FIG. 37) prints on the roll paper RS (for example, shown in FIG. 37) in the real space GK. The information on the movement path of the roll paper RS is a coordinate position of a start point and a coordinate position of an end point on the movement path of the roll paper RS (shown by a white arrow in FIG. 38). Here, it is assumed that the coordinate position of a start point STT of the roll paper RS is (X70, Y70, Z70) and the coordinate position of an end point END thereof is (X71, Y71, Z71) in the real space GK as shown in FIG. 37. Here, the roll paper RS is an example of a "target".

Operation of Fifth Exemplary Embodiment

Figure 36:
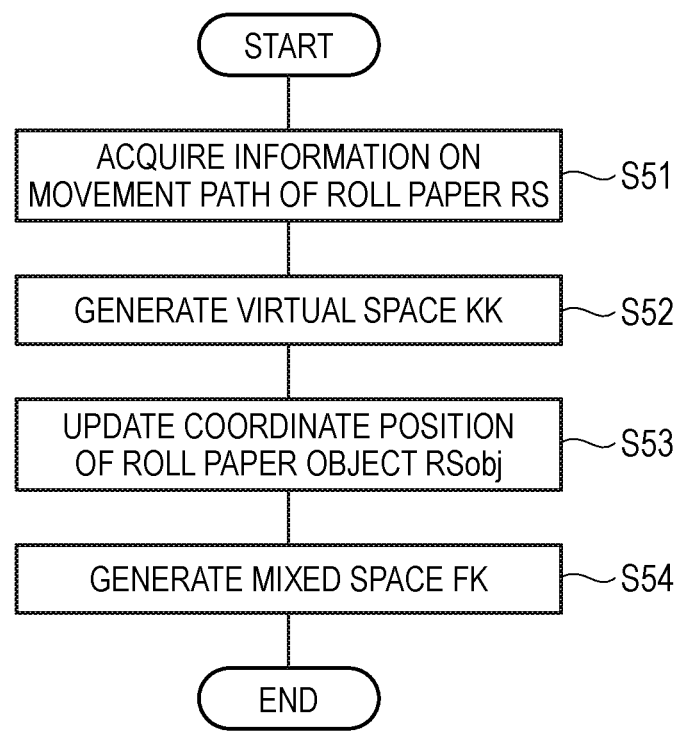
FIG. 36 is a flowchart showing operation of an information processing device according to a fifth exemplary embodiment.
Figure 38:
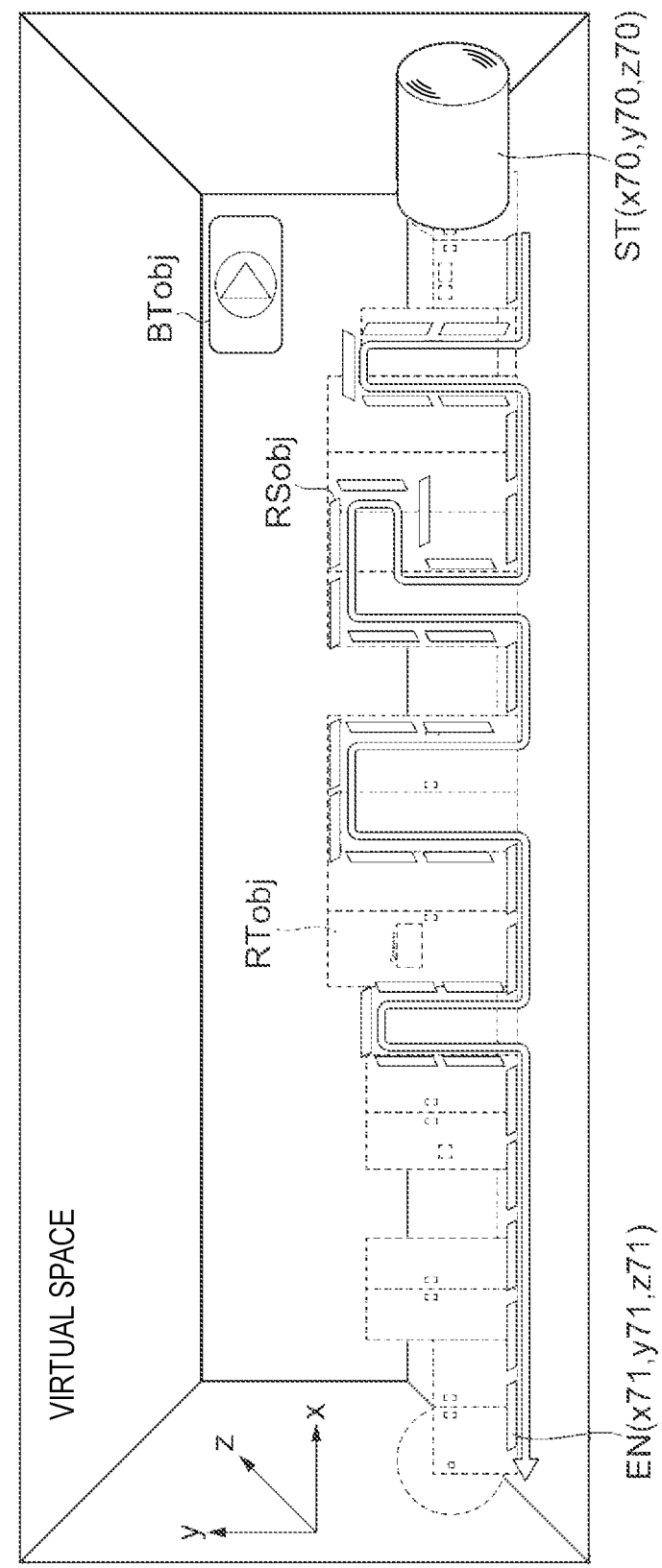
FIG. 38 shows an example of a virtual space according to the fifth exemplary embodiment.
Figure 39:
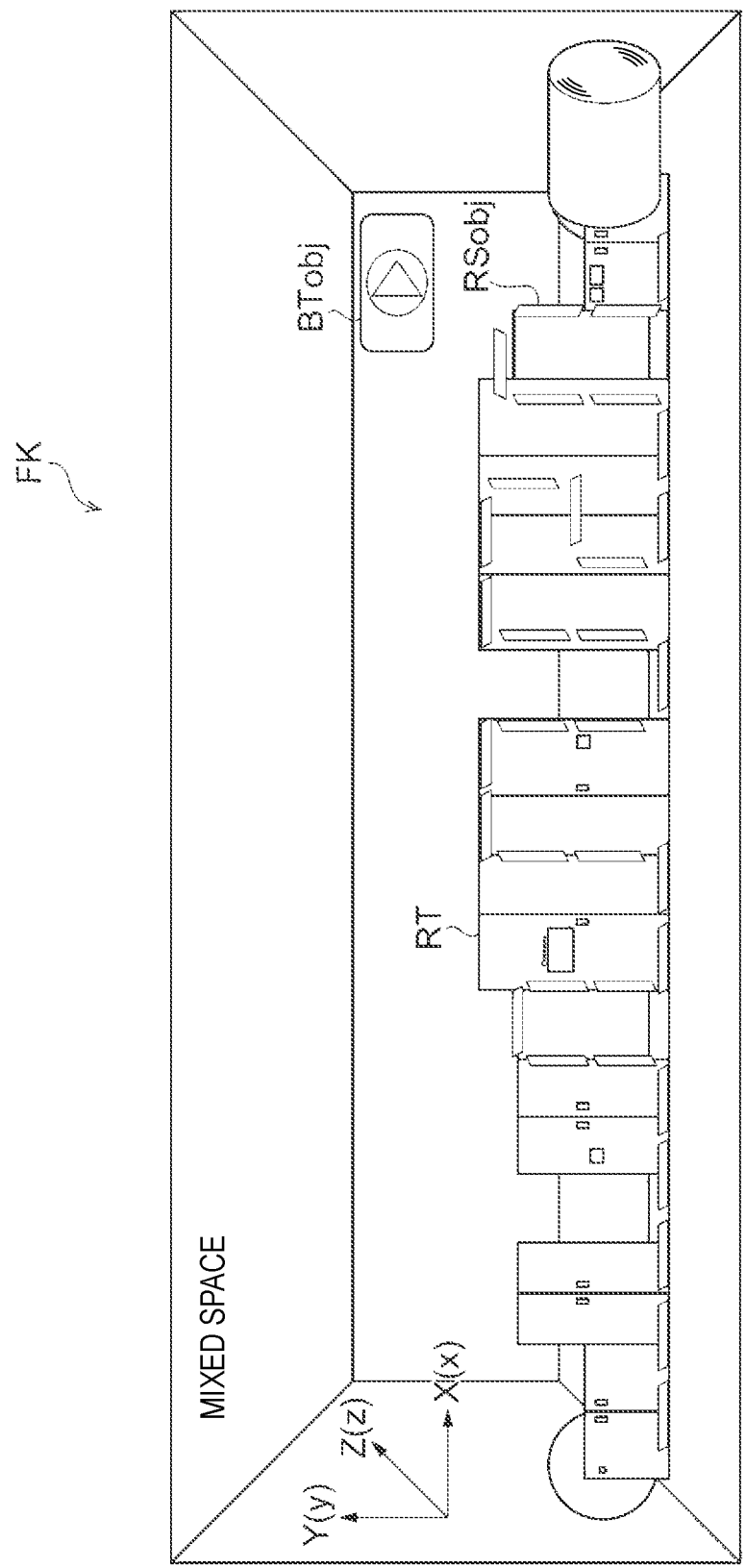
FIG. 39 shows an example of a mixed space according to the fifth exemplary embodiment.

FIG. 36 is a flowchart showing operation of the information processing device JS according to a fifth exemplary embodiment. FIG. 37 shows an example of a real space according to the present exemplary embodiment. FIG. 38 shows an example of a virtual space according to the present exemplary embodiment. FIG. 39 shows an example of a mixed space according to the present exemplary embodiment.

Hereinafter, the operation of the information processing device JS according to the present exemplary embodiment will be described with reference to the flowchart shown in FIG. 36, and FIGS. 37 to 39.

[Step S51] In the information processing device JS, the CPU 2 serves as the acquisition unit 11 (shown in FIG. 2) to acquire the information on the movement path of the roll paper RS when the continuous printing device RT prints on the roll paper RS in the real space GK from the continuous printing device object RTobj in the virtual space KK (shown in FIG. 38) corresponding to the continuous printing device RT in the real space GK (shown in FIG. 37). More specifically, the CPU 2 acquires the coordinate position (X70, Y70, Z70) of the start point STT and the coordinate position (X71, Y71, Z71) of the end point END of the roll paper RS. Since the continuous printing device object RTobj is an object for the information processing device JS to acquire the information on the movement path of the roll paper RS, the continuous printing device object RTobj is not required to be visible for a user of the information processing device JS, and is invisible.

[Step S52] When the coordinate position (X70, Y70, Z70) of the start point STT and the coordinate position (X71, Y71, Z71) of the end point END of the roll paper RS in the real space GK are acquired in step S51, the CPU 2 serves as the generation unit 13 (shown in FIG. 2) to generate in the virtual space KK the roll paper object RSobj corresponding to the roll paper RS in the real space GK and a play button object BTobj as shown in FIG. 38. Here, the roll paper object RSobj is an example of "a dynamic display object" that displays in video the movement path in which the roll paper RS moves in the real space GK. The play button object BTobj is an object for instructing play and stop of the roll paper object RSobj serving as the dynamic display object.

[Step S53] When the roll paper object RSobj and the play button object BTobj are generated in step S52, the CPU 2 serves as the update unit 14 (shown in FIG. 2) to update a position of the roll paper object RSobj in the virtual space KK based on the information on the movement path of the roll paper RS, that is, the coordinate position (X70, Y70, Z70) of the start point STT and the coordinate position (X71, Y71, Z71) of the end point END of the roll paper RS in the real space GK. Thereby, the CPU 2 acquires a coordinate position (x70, y70, z70) of the start point ST and a coordinate position (x71, y71, z71) of the end point EN of the roll paper object RSobj in the virtual space KK.

[Step S54] When the coordinate position (x70, y70, z70) of the start point ST and the coordinate position (x71, y71, z71) of the end point EN of the roll paper object RSobj are acquired in step S54, the CPU 2 serves as the mixing unit 15 (shown in FIG. 2) to generate the mixed space FK shown in FIG. 39 by mixing the continuous printing device RT and the roll paper RS in the real space GK (shown in FIG. 37), with the roll paper object RSobj and the play button object Btobj in the virtual space KK (shown in FIG. 38).

In the generated mixed space FK, there is the continuous printing device RT, the roll paper RS, the roll paper object RSobj and the play button object BTobj, which are visible.

The user of the information processing device JS recognizes how the roll paper RS moves by visually recognizing the mixed space FK through the roll paper object RSobj virtually displaying a movement path of the roll paper RS in the virtual space KK even if the continuous printing device RT does not print on the roll paper RS in the real space GK.

In the present exemplary embodiment, the coordinate position of the roll paper object RSobj in the virtual space KK is set along the movement path of the roll paper RS in the real space GK as described above. That is, the start point ST and the end point EN of the roll paper object RSobj serving as the dynamic display object in the virtual space KK match the start point STT and the end point END of the movement path of the roll paper RS in the real space GK.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the embodiments described above, instead of being stored (installed) in the storage medium 4 in advance, the program PR may be provided to be recorded on a recording medium such as a compact disc read only memory (CD-ROM), a digital versatile disc read only memory (DVD-ROM) and a universal serial bus (USB) memory, or may be downloaded from an external device via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
    a processor configured to:
        associate an associated object of a virtual space with at least a part of a first body and at least a part of a second body existing in a real space;
        perform control to display an image of mixed reality space, which allows a user to see (i) the first body and the second body and (ii) the associated object, in association with each other; and,
        in response to the first body being moved in the real space, move the associated object in the mixed reality space while maintaining a relative positional relationship between the associated object and the at least the part of the first body, wherein:
    the associated object is an image object indicating a positional information between the first body and the second body, and
    the processor is further configured to arrange and display, in the mixed reality space, one end of the associated object at around the at least the part of the moved first body, and another end of the associated object at around the at least the part of the second body.

2. The information processing device according to claim 1, wherein the associated object are associated with the at least the part of the first body and the at least the part of the second body indirectly.

3. The information processing device according to claim 1, wherein
    the processor is further configured to:
        generate a first body object of the virtual space, the first body object corresponding to the first body, wherein the associating of the associated object indirectly with the at least the part of the first body is performed by associating the associated object with at least a part of the first body object that corresponds to the at least the part of the first body.

4. The information processing device according to claim 3, wherein
    the processor is configured to arrange the first body object in the mixed reality space so that the first body object overlaps a position of the moved first body, and the first body object is invisible in the mixed reality space.

5. The information processing device according to claim 1, wherein
    the associated object is an arrow image that, in the mixed reality space, starts from the at least the part of the first body and that ends at the at least the part of the second body.

6. The information processing device according to claim 1, wherein
    the processor is further configured to
        specify a relationship between the first body object, the second body object, and the associated object in the virtual space based on a first processing device serving as the first body and a second processing device serving as the second body in the real space and a processing step performed by at least one of the first processing device or the second processing device in the real space.

7. The information processing device according to claim 3, wherein
    the processor is further configured to
        specify a relationship between the first body object, the second body object, and the associated object in the virtual space based on a first processing device serving as the first body and a second processing device serving as the second body in the real space and a processing step performed by at least one of the first processing device or the second processing device in the real space.

8. The information processing device according to claim 6, wherein
    the associated object is an arrow image that, in the mixed reality space, starts from the at least the part of the first body and that ends at the at least the part of the second body, and
    the processor is further configured to
        specify a position at which the arrow image starts based on attribute information of a target object in the virtual space corresponding to a target on which the at least one of the first processing device or the second processing device performs the processing step in the real space, and
        specify a position at which the arrow image ends based on a position of the second body object in the virtual space corresponding to the second body on which another processing step may be performed following the processing step in the real space.

9. The information processing device according to claim 7, wherein
    the associated object is an arrow image that, in the mixed reality space, starts from the at least the part of the first body and that ends at the at least the part of the second body, and
    the processor is further configured to
        specify a position at which the arrow image starts based on attribute information of a target object in the virtual space corresponding to a target on which the at least one of the first processing device or the second processing device performs the processing step in the real space, and
        specify a position at which the arrow image ends based on a position of the second body object in the virtual space corresponding to the second body on which another processing step may be performed following the processing step in the real space.

10. The information processing device according to claim 8, wherein
    the processor is further configured to specify the another processing step based on the processing step performed on the target by the first body in the real space, specify the position at which the arrow image starts based on a position of the target object in the virtual space, and specify the position at which the arrow object ends based on a position of the second body object in the virtual space corresponding to the second body in the real space on which the specified another processing step is performed.

11. The information processing device according to claim 9, wherein
the processor is further configured to
specify the another processing step based on the processing step performed on the target by the first body in the real space, specify the position at which the arrow image starts based on a position of the target object in the virtual space, and specify the position at which the arrow object ends based on a position of the second body object in the virtual space corresponding to the second body in the real space on which the specified another processing step is performed.

12. The information processing device according to claim 8, wherein
the processor is further configured to
receive the another processing step from a user in response to the processing step performed on the target by the first body in the real space, specify the position at which the arrow image starts based on a position of the target object in the virtual space, and specify the position at which the arrow object ends based on a position of the second body object in the virtual space corresponding to the second body in the real space on which the received another processing step is performed.

13. The information processing device according to claim 9, wherein
the processor is further configured to
receive the another processing step from a user in response to the processing step performed on the target by the first body in the real space, specify the position at which the arrow image starts based on a position of the target object in the virtual space, and specify the position at which the arrow object ends based on a position of the second body object in the virtual space corresponding to the second body in the real space on which the received another processing step is performed.

14. A non-transitory computer readable medium storing an information processing program causing a computer to execute a processing, the process comprising:
associating an associated object of a virtual space with at least a part of a first body and at least a part of a second body existing in a real space;

performing control to display an image of mixed reality space, which allows a user to see (i) the first body and the second body and (ii) the associated object, in association with each other; and, in response to the first body being moved in the real space, moving the associated object in the mixed reality space while maintaining a relative positional relationship between the associated object and the at least the part of the first body, wherein:

the associated object is an image object indicating a positional information between the first body and the second body, and the processor is configured to arrange and display, in the mixed reality space, one end of the associated object at around the at least the part of the moved first body, and another end of the associated object at around the at least the part of the second body.

* * * * *